United States Patent
Wittek et al.

(10) Patent No.: US 7,838,090 B2
(45) Date of Patent: Nov. 23, 2010

(54) LIQUID-CRYSTALLINE MEDIUM AND LIQUID-CRYSTAL DISPLAY

(75) Inventors: Michael Wittek, Darmstadt (DE); Brigitte Schuler, Grossostheim (DE); Renate Graulich, Riedstadt (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 12/362,947

(22) Filed: Jan. 30, 2009

(65) Prior Publication Data
US 2009/0194739 A1    Aug. 6, 2009

(30) Foreign Application Priority Data
Feb. 1, 2008    (DE) .............. 10 2008 007 242

(51) Int. Cl.
C09K 19/30 (2006.01)
C09K 19/34 (2006.01)
C09K 19/12 (2006.01)
C09K 19/20 (2006.01)

(52) U.S. Cl. .............. 428/1.1; 252/299.61; 252/299.63; 252/299.66; 252/299.67

(58) Field of Classification Search .................. 428/1.1; 252/299.61, 299.63, 299.66, 299.67
See application file for complete search history.

(56) References Cited

U.S. PATENT DOCUMENTS

| | | | |
|---|---|---|---|
| 7,105,210 B2 * | 9/2006 | Heckmeier et al. | 428/1.1 |
| 7,595,101 B2 * | 9/2009 | Wittek et al. | 428/1.1 |
| 2003/0190436 A1 * | 10/2003 | Manabe et al. | 428/1.1 |
| 2004/0173776 A1 * | 9/2004 | Heckmeier et al. | 252/299.63 |
| 2005/0040365 A1 | 2/2005 | Heckmeier et al. | |
| 2008/0083904 A1 * | 4/2008 | Wittek et al. | 252/299.67 |
| 2008/0199635 A1 * | 8/2008 | Hirschmann et al. | 428/1.1 |

FOREIGN PATENT DOCUMENTS

| | | | |
|---|---|---|---|
| EP | 1310542 A | 5/2003 | |
| WO | 2004044093 A | 5/2004 | |
| WO | 2005017067 A | 2/2005 | |
| WO | 2005123880 A | 12/2005 | |
| WO | 2008025533 A | 3/2008 | |

* cited by examiner

Primary Examiner—Shean C Wu
(74) Attorney, Agent, or Firm—Millen, White, Zelano & Branigan, P.C.

(57) ABSTRACT

Disclosed are dielectrically positive liquid-crystalline media containing a dielectrically positive component, component A, which contains one or more dielectrically positive compounds of formulae IA, IB and IC:

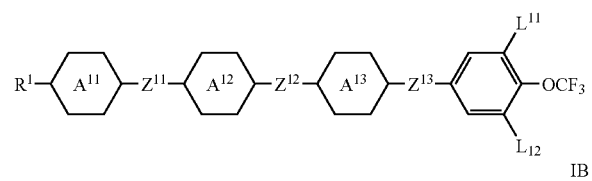

IA

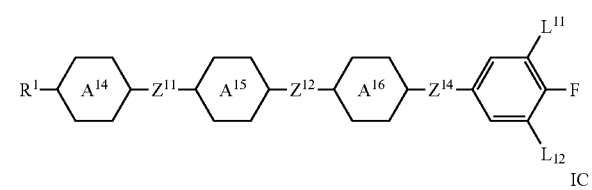

IB

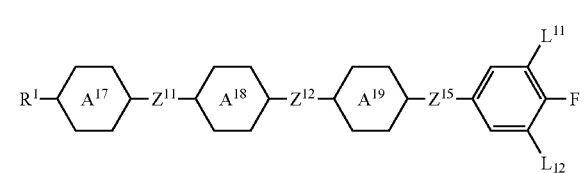

IC and optionally a second dielectrically positive component, component B, containing one or more dielectrically positive compounds having a dielectric anisotropy of greater than 3, and optionally a dielectrically neutral component, component C, and
liquid-crystal displays containing these media, especially active-matrix displays and in particular TN, IPS and FFS displays.

18 Claims, No Drawings

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that utilise an electric field which is substantially parallel to the substrates or the liquid-crystal layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. In particular for monitor applications, the rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$), and the dielectric anisotropy ($\Delta\epsilon$) should be sufficiently high to allow a reasonably low operating voltage. $\Delta\epsilon$ should preferably be greater than 2 and very preferably greater than 3, but preferably not greater than 15 and in particular not greater than 12, as this would prevent an at least fairly high resistivity.

For applications as displays for notebooks or other mobile applications, the rotational viscosity should preferably be 120 mPa·s or less and particularly preferably 100 mPa·s or less. The dielectric anisotropy ($\Delta\epsilon$) here should preferably be greater than 8 and particularly preferably greater than 12.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes according to the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long response times, have inadequate values of the resistivity and/or require excessively high operating voltages. In addition, there is a demand for improving the low-temperature behaviour of LCDs. Both an improvement in the operating properties and also in the shelf life are necessary here.

Thus, there is a considerable need for liquid-crystalline media having suitable properties for practical applications, such as a broad nematic phase range, suitable optical anisotropy $\Delta n$ corresponding to the display type used, a high $\Delta\epsilon$ and particularly low viscosities for particularly short response times.

PRESENT INVENTION

Surprisingly, it has now been found that it is possible to achieve liquid-crystalline media having a suitably high $\Delta\epsilon$, a suitable phase range and $\Delta n$ which do not exhibit the disadvantages of the materials from the prior art, or at least only do so to a significantly lesser extent.

These improved liquid-crystalline media according to the present application comprise at least the following components:

a first dielectrically positive component, component A, comprising one or more dielectrically positive compounds of the formula IA, one or more dielectrically positive compounds of the formula IB and one or more dielectrically positive compounds of the formula IC

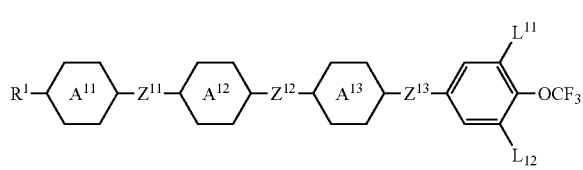

IA

-continued
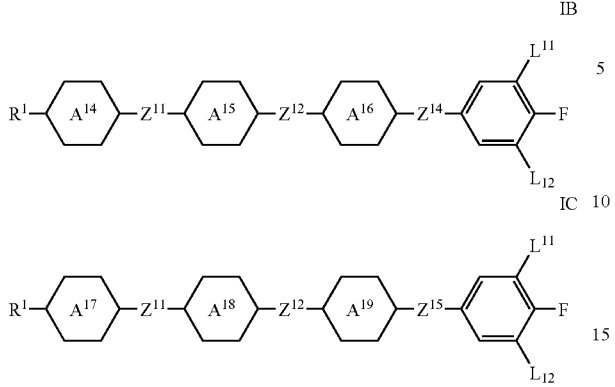
in which
R¹ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,
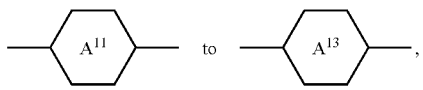
independently of one another, denote
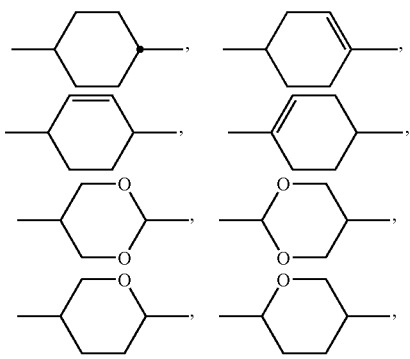
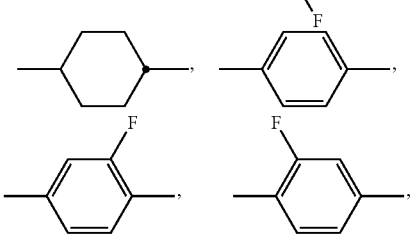
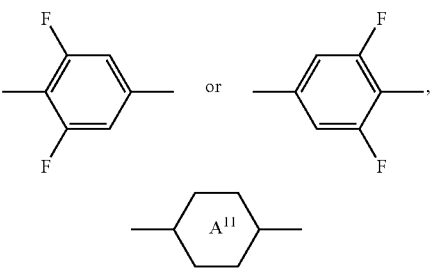
preferably denotes
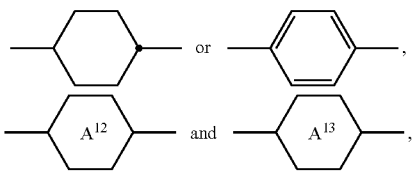
independently of one another, preferably denote
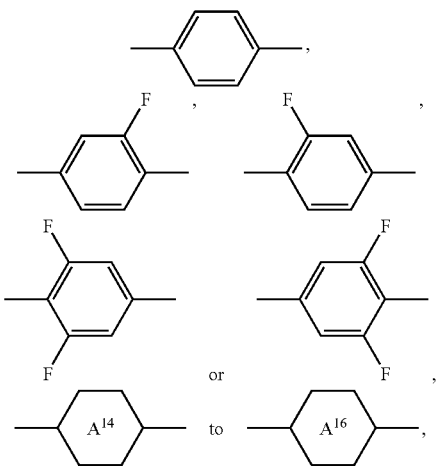
independently of one another, denote
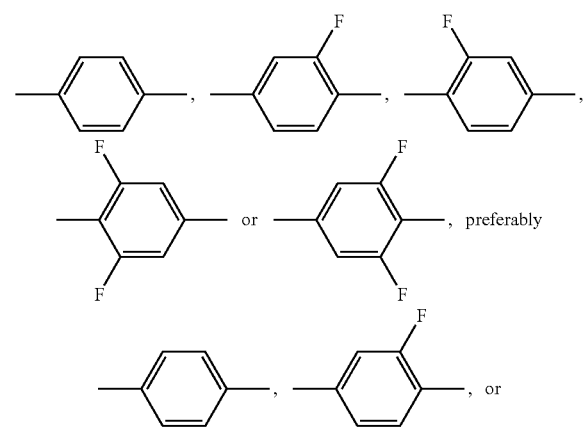

-continued

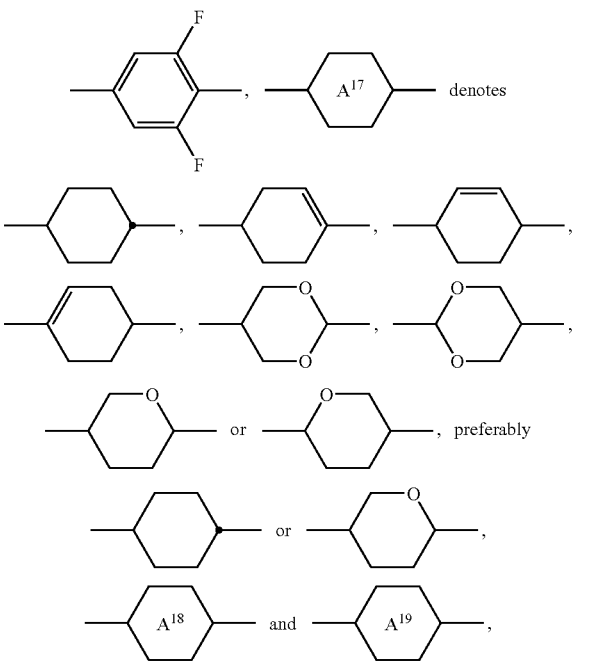

independently of one another, denote

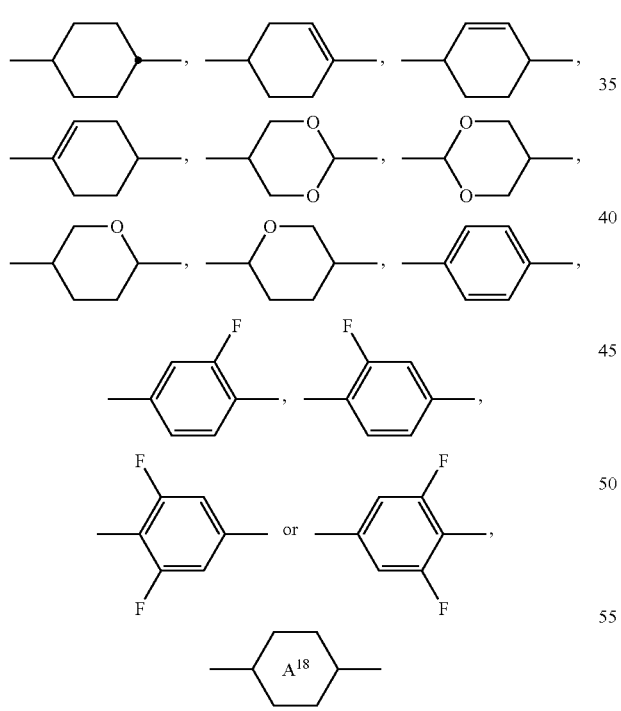

preferably denotes

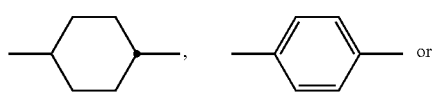

-continued and preferably denotes more preferably $Z^{11}$ to $Z^{15}$, independently of one another, denote —CH$_2$CH$_2$—, —CF$_2$CF$_2$—, —COO—, trans-CH=CH—, trans-CF=CF—, —CH$_2$O—, —CF$_2$O— or a single bond, preferably —CH$_2$CH$_2$—, —COO—, trans-CH=CH— or a single bond, particularly preferably —CF$_2$O— or a single bond, and $Z^{13}$ very particularly preferably denotes a single bond and $Z^{14}$ and $Z^{15}$ very particularly preferably denote —CF$_2$O—, $L^{11}$ and $L^{12}$, independently of one another, denote H, F or Cl, preferably H or F, preferably one or both and particularly both denote F, and optionally a second dielectrically positive component, component B, comprising one or more dielectrically positive compounds, preferably having a dielectric anisotropy of greater than 3, preferably selected from the group of the compounds of the formulae II and III:

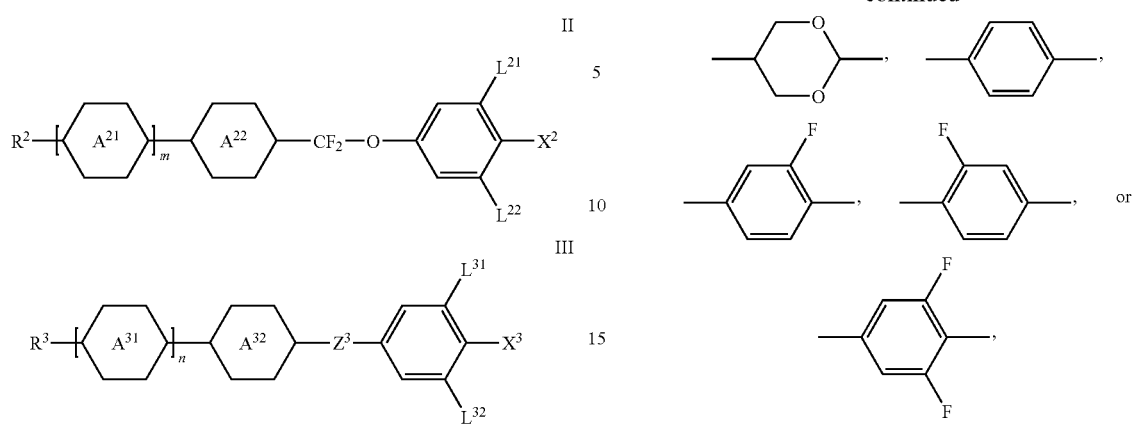

in which

R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and R² and R³ preferably denote alkyl or alkenyl,

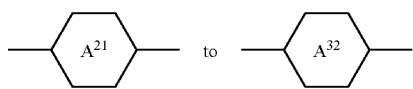

on each occurrence, independently of one another, denote

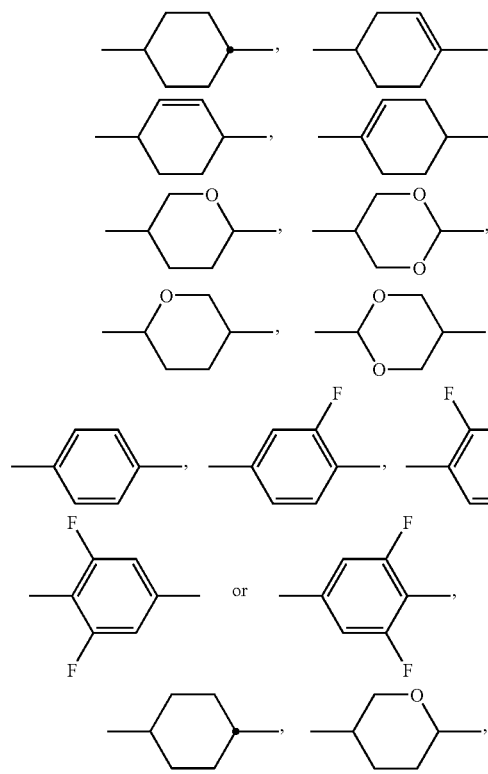

$L^{21}$, $L^{22}$, $L^{31}$ and $L^{32}$, independently of one another, denote H or F, $L^{21}$ and/or $L^{31}$ preferably denote F, X² and X³, independently of one another, denote halogen, halogenated alkyl or alkoxy having 1 to 3 C atoms or halogenated alkenyl or alkenyloxy having 2 or 3 C atoms, preferably F, Cl, —OCF₃ or —CF₃, very preferably F, Cl or —OCF₃, Z³ denotes —CH₂CH₂—, —CF₂CF₂—, —COO—, trans-CH═CH—, trans-CF═CF—, —CH₂O— or a single bond, preferably —CH₂CH₂—, —COO—, trans-CH═CH— or a single bond and very preferably —COO—, trans-CH═CH— or a single bond, and m and n, independently of one another, denote 0, 1 or 3, preferably 1 or 3 and particularly preferably 1, and, in the case where X² does not denote F or OCF₃, m may also denote 2, and, in the case where X³ does not denote F or OCF₃ and/or Z³ does not denote a single bond, n may also denote 2, and optionally a dielectrically neutral component, component C, comprising one or more dielectrically neutral compounds of the formula IV

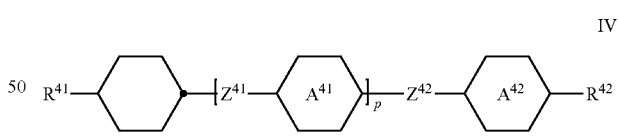

in which

R⁴¹ and R⁴², independently of one another, have the meaning indicated above for R² under formula II, preferably R⁴¹ denotes alkyl and R⁴² denotes alkyl or alkoxy or R⁴¹ denotes alkenyl and R⁴² denotes alkyl,

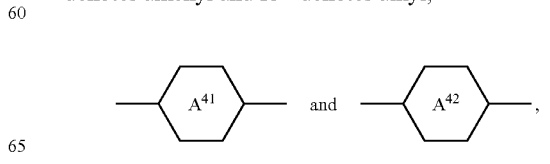

independently of one another and, in the case where

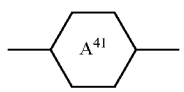

occurs twice, also these independently of one another, denote

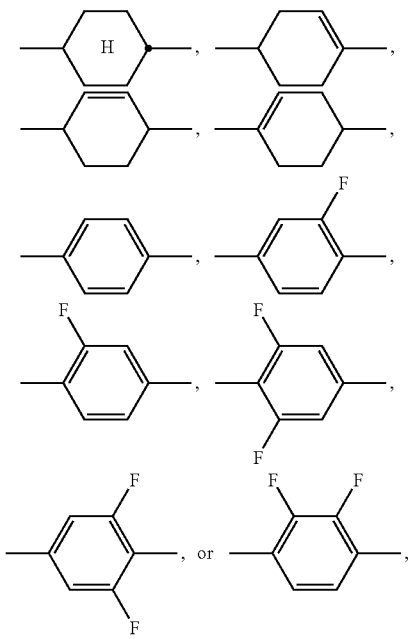

preferably one or more of

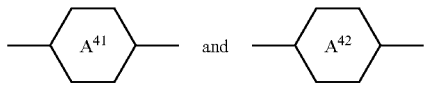

denotes

$Z^{41}$ and $Z^{42}$, independently of one another and, in the case where $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

Component A preferably in each case comprises, more preferably predominantly consists of, even more preferably essentially consists of and very preferably entirely consists of one or more dielectrically positive compounds of the formula IA, IB and IC having a dielectric anisotropy of greater than 3 in which the parameters have the respective meanings indicated above under formulae IA to IC.

The liquid-crystalline media according to the present application preferably comprise in total 1 to 30%, preferably 2 to 20%, of compounds of the formula IA, 1 to 30%, preferably 2 to 20%, of compounds of the formula IB, and 1 to 30%, preferably 2 to 20%, of compounds of the formula IC.

The individual compounds are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, its concentration can be in the range from 2 to 20%, preferably from 3 to 14%.

The concentration of component A in the medium is preferably in the range from 10% to 50%, more preferably from 12% to 40%, even more preferably from 15% to 35% and very preferably from 20%, preferably from 23%, to 30%. If a single homologous compound of the respective formulae IA, IB and IC is used in the medium, its concentration is preferably in the range from 1% to 20%, if two or more homologous compounds of the respective formulae IA, IB and/or IC are used in the medium, 2% to 15% of the individual homologues are preferably used.

In a preferred embodiment of the present invention, component A in each case comprises, more preferably predominantly consists of, even more preferably essentially consists of and very preferably entirely consists of one or more dielectrically positive compounds having a dielectric anisotropy of greater than 3, selected from the group of the compounds of the formulae IA-1 and IA-2, selected from the group of the compounds of the formulae IB-1 and IB-2 and selected from the group of the compounds of the formulae IC-1 and IC-2, preferably the compounds of the formulae IA-1, IB-2 and IC-2:

IA-1

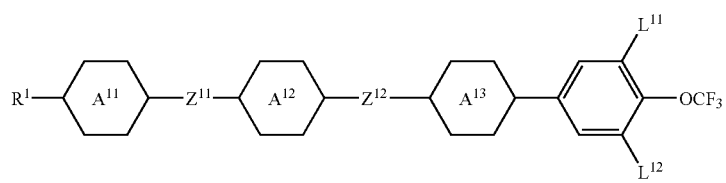

-continued

IA-2
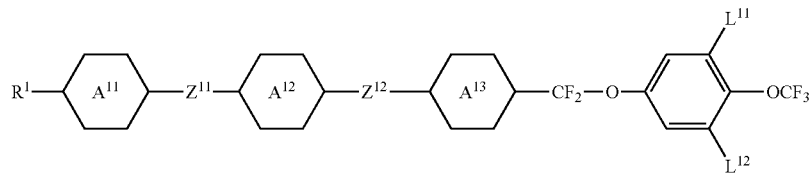

IB-1
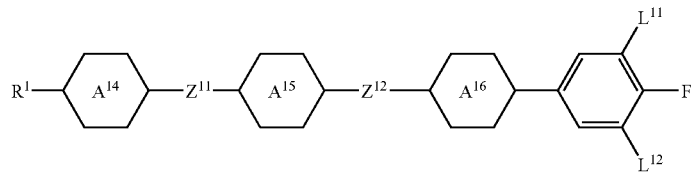

IB-2
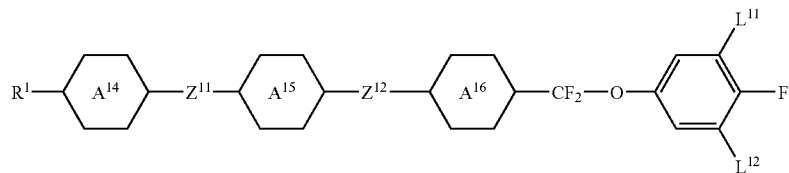

IC-1
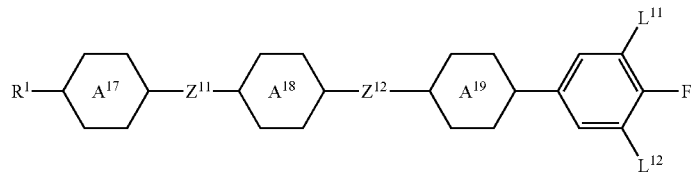

IC-2
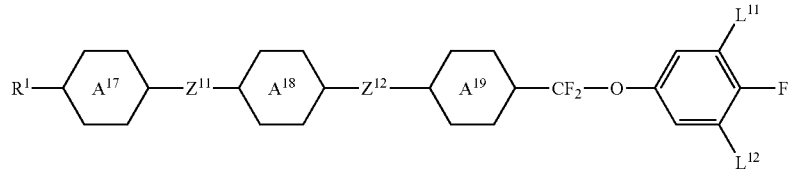

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae IA-1a to IA-1d/IA-1g, preferably selected from the group of the compounds of the formulae IA-1a and IA-1b:

IA-1a
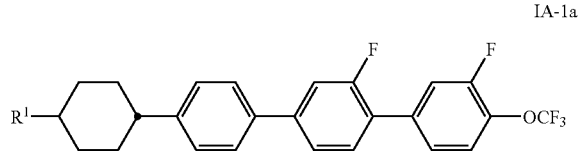

IA-1b
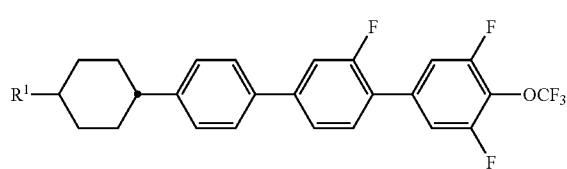

-continued

IA-1c
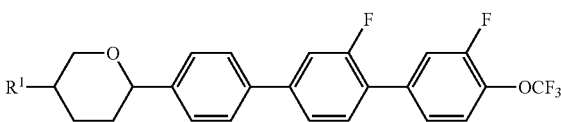

IA-1d
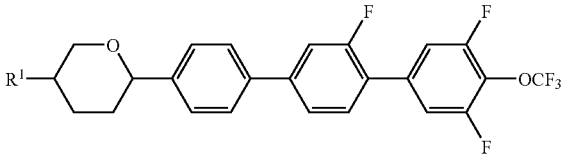

IA-1f
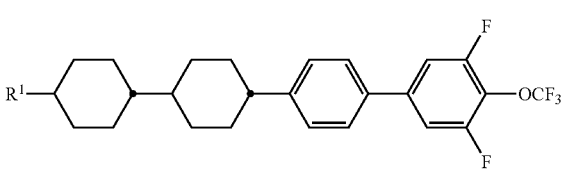

-continued

IA-1g
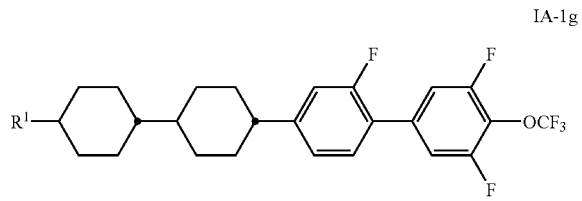

in which R¹ has the respective meaning indicated above under formula IA.

In a preferred embodiment of the present invention, component A comprises, more preferably predominantly consists of, still more preferably essentially consists of and very preferably entirely consists of one or more dielectrically positive compounds having a dielectric anisotropy of greater than 3, selected from the group of the compounds of the formulae IA-2a to IA-2d, preferably selected from the group of the compounds of the formulae IA-2a to IA-2b:

IA-2a
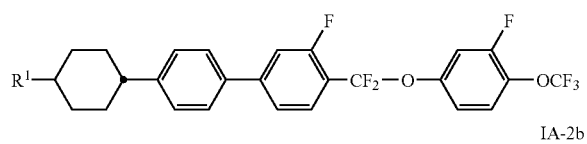

IA-2b
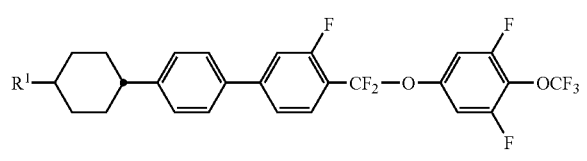

IA-2c
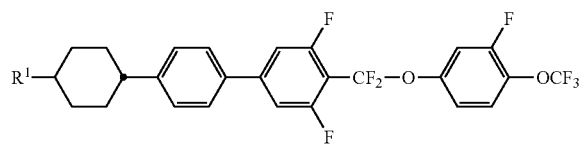

IA-2d
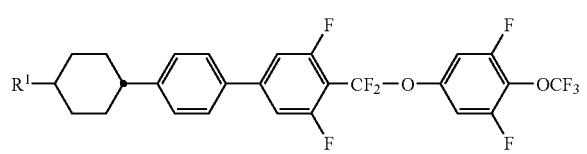

in which R¹ has the respective meaning indicated above under formula IA.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae IB-1a to IB-1c, preferably selected from the group of the compounds of the formulae IB-1a and IB-1b:

IB-1a
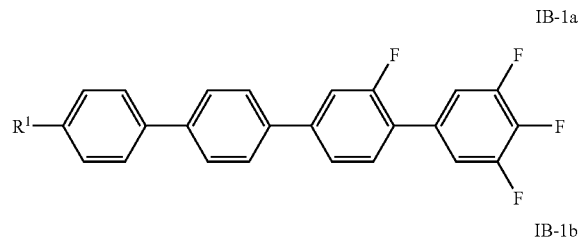

IB-1b

IB-1c
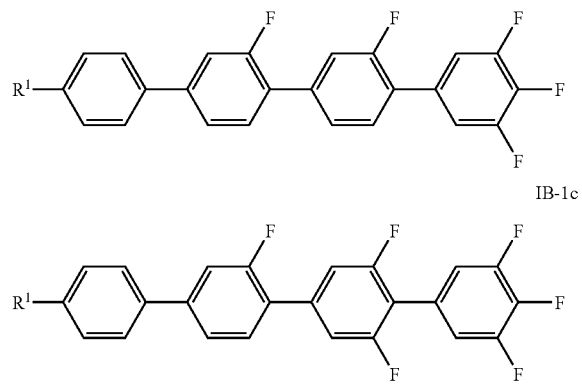

in which R¹ has the respective meaning indicated above under formula IB.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae IB-2a to IB-2c, preferably selected from the group of the compounds of the formulae IB-2a and IB-2c:

IB-2a
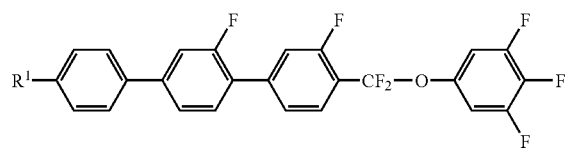

IB-2b
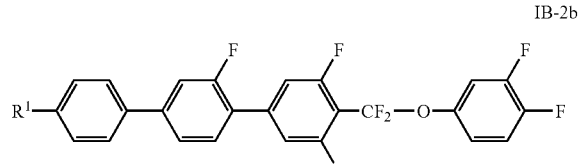

IB-2c
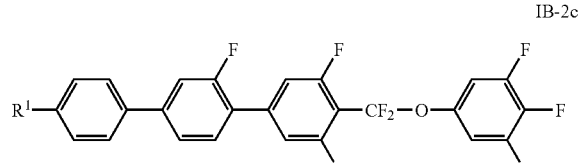

in which R¹ has the respective meaning indicated above under formula I.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae IC-1a to IC-1c, preferably of the formulae IC-1a and IC-1c, preferably of the formula IC-1c:

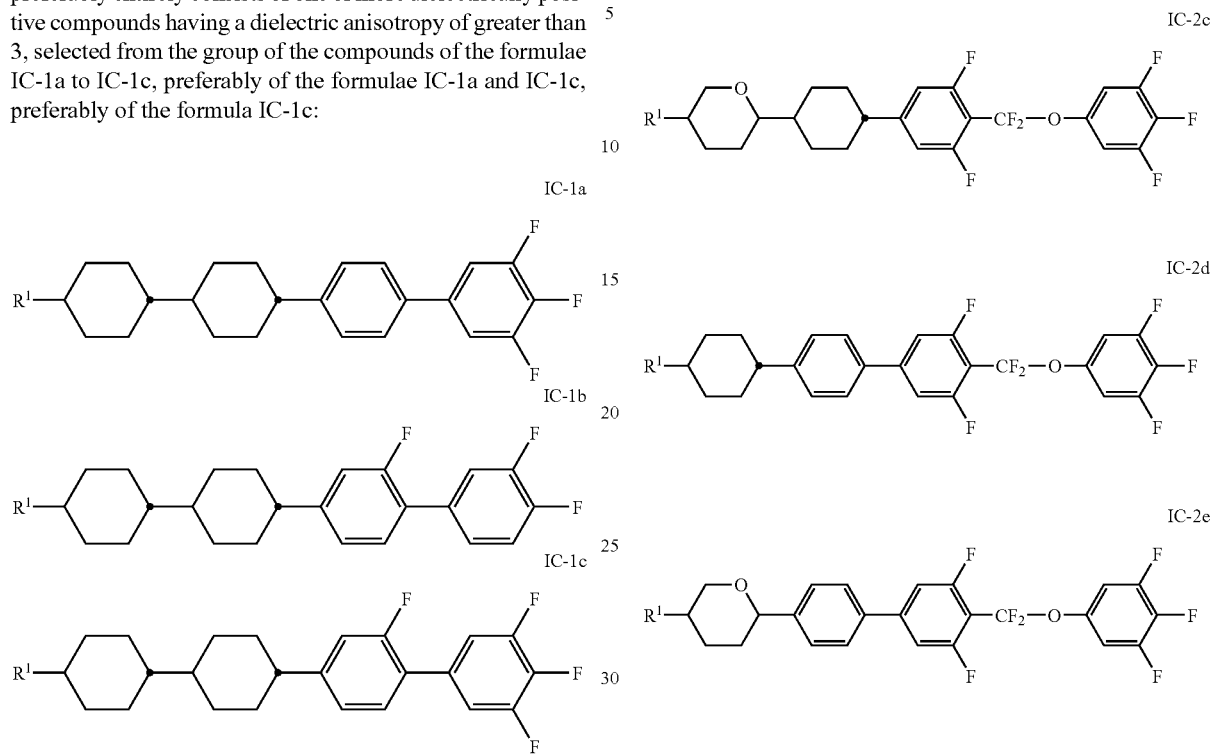

in which $R^1$ has the respective meaning indicated above under formula IC.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae IC-2a to IC-2f, preferably selected from the group of the compounds of the formulae IC-2a, IC-2b, IC-2d, IC-2e and IC-2f, more preferably selected from the group of the compounds of the formulae IC-2b, IC-2e and IC-2f:

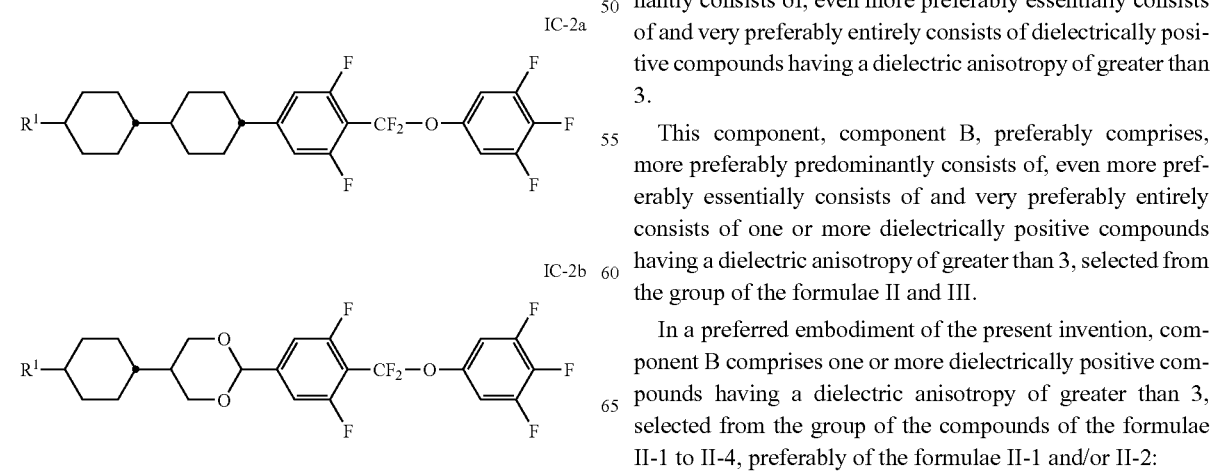

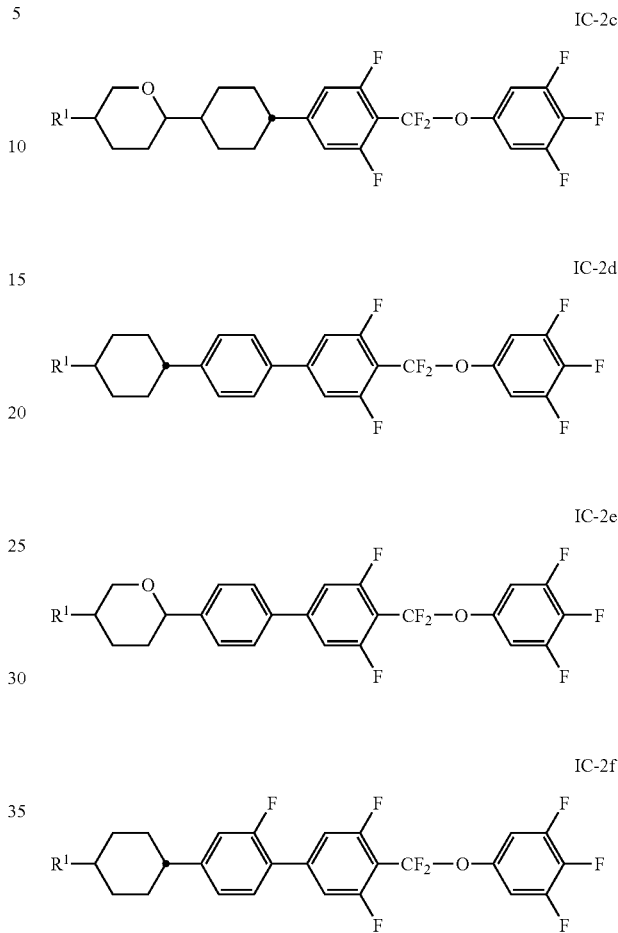

in which $R^1$ has the respective meaning indicated above under formula IC.

The media according to the present invention preferably comprise a second dielectrically positive component, component B. This second dielectrically positive component, component B, preferably comprises, more preferably predominantly consists of, even more preferably essentially consists of and very preferably entirely consists of dielectrically positive compounds having a dielectric anisotropy of greater than 3.

This component, component B, preferably comprises, more preferably predominantly consists of, even more preferably essentially consists of and very preferably entirely consists of one or more dielectrically positive compounds having a dielectric anisotropy of greater than 3, selected from the group of the formulae II and III.

In a preferred embodiment of the present invention, component B comprises one or more dielectrically positive compounds having a dielectric anisotropy of greater than 3, selected from the group of the compounds of the formulae II-1 to II-4, preferably of the formulae II-1 and/or II-2:

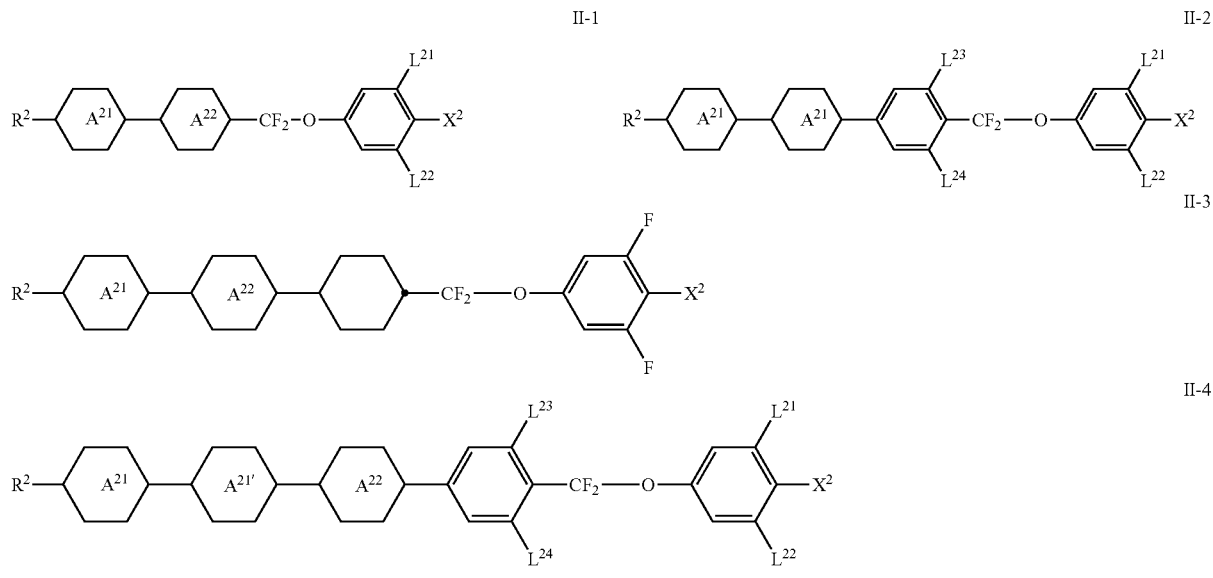

in which the parameters have the respective meanings indicated above under formula II, and $L^{23}$ and $L^{24}$, independently of one another, denote H or F, preferably $L^{23}$ denotes F, and

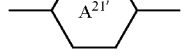

has one of the meanings given for

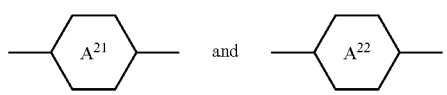

and, for the formulae II-1 and II-4, $X^2$ preferably denotes F or $OCF_3$, particularly preferably F, and, for the formula II-3,

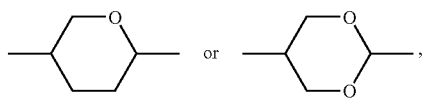

independently of one another, preferably denote

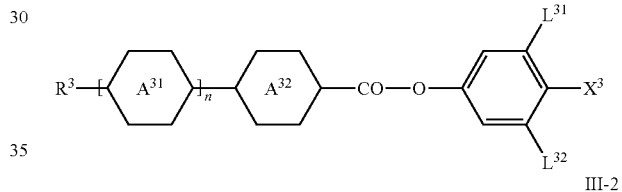

and/or selected from the group of the compounds of the formulae III-1 and III-2:

in which the parameters have the meaning given under formula III, and the media according to the present invention alternatively or in addition to the compounds of the formulae III-1 and/or III-2 may comprise one or more compounds of the formula III-3

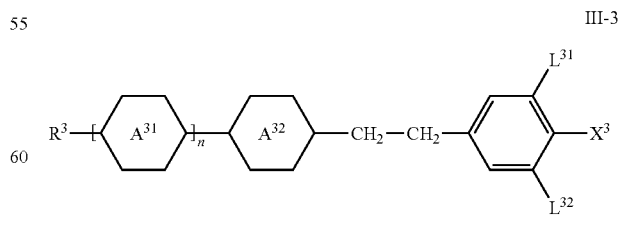

in which the parameters have the respective meanings indicated above, and the parameters $L^{33}$ and $L^{34}$, independently of one another and of the other parameters, denote H or F.

Component B preferably predominantly consists of, even more preferably essentially consists of and very preferably entirely consists of the said compounds.

Component B preferably comprises compounds which are selected from the group of the compounds of the formulae II-1 to II-4 in which $L^{21}$ and $L^{22}$ and/or $L^{23}$ and $L^{24}$ both denote F.

In a preferred embodiment, component B comprises compounds which are selected from the group of the compounds of the formulae II-2 and II-3 in which $L^{21}$, $L^{22}$, $L^{23}$ and $L^{24}$ all denote F.

Component B preferably comprises one or more compounds of the formula II-1. The compounds of the formula II-1 are preferably selected from the group of the compounds of the formulae II-1a to II-1e:

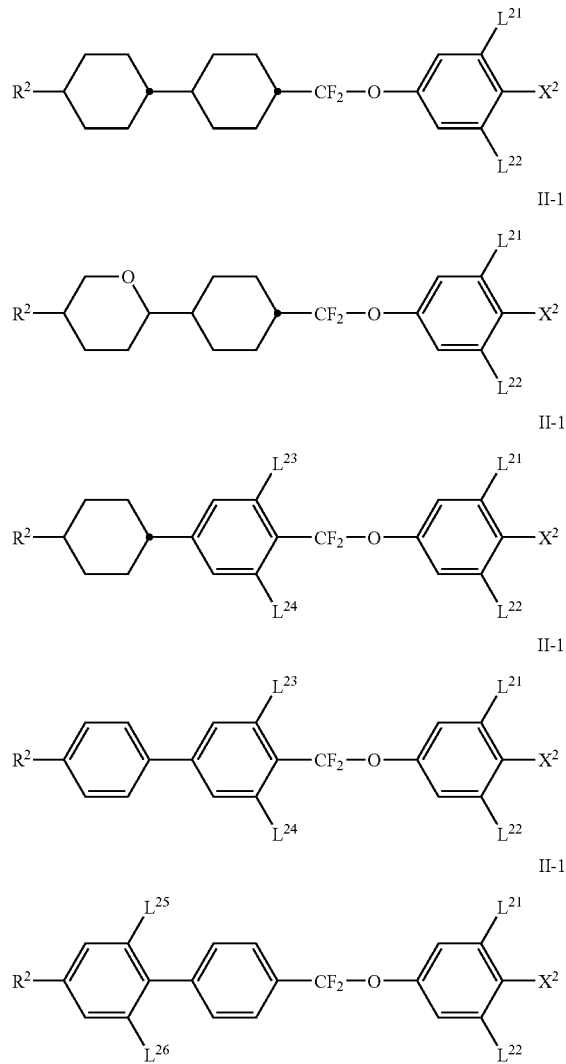

in which the parameters have the respective meanings indicated above, and $L^{25}$ and $L^{26}$, independently of one another and of the other parameters, denote H or F, and preferably in the formulae II-1a and II-1b $L^{21}$ and $L^{22}$ both denote F, in the formulae II-1c and II-1d $L^{21}$ and $L^{22}$ both denote F and/or $L^{23}$ and $L^{24}$ both denote F, and in formula II-1e $L^{21}$, $L^{22}$ and $L^{23}$ denote F.

Especially preferred compounds of the formula II-1 are

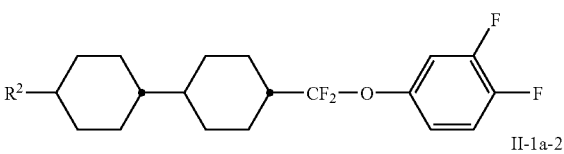

II-1a-1

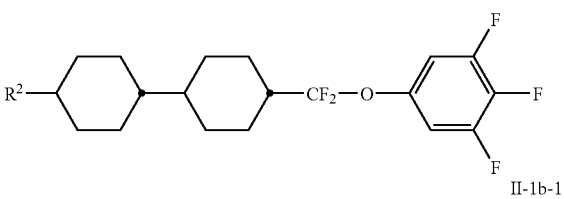

II-1a-2

II-1b-1

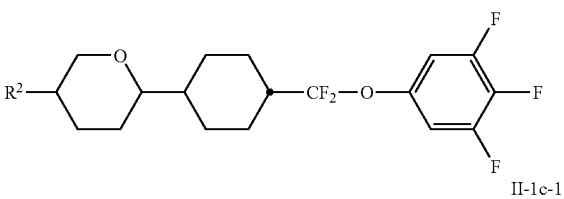

II-1c-1

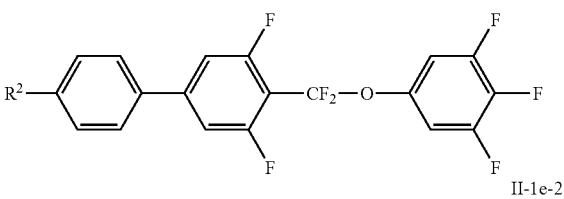

II-1e-2

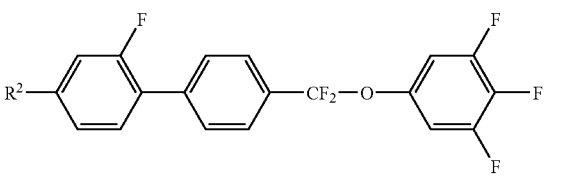

in which $R^2$ has the meaning indicated above.

Component B preferably comprises one or more compounds of the formula II-2, which are preferably selected from the group of the compounds of the formulae II-2a to II-2j:

II-2a

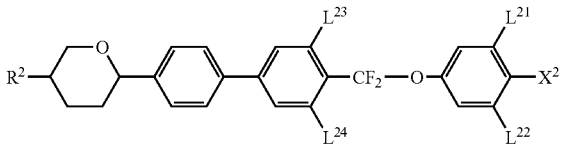

-continued

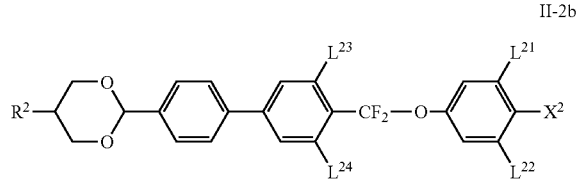
II-2b

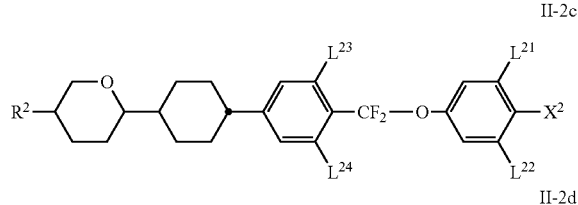
II-2c

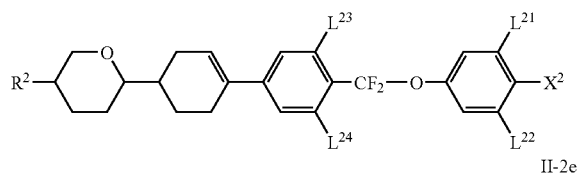
II-2d

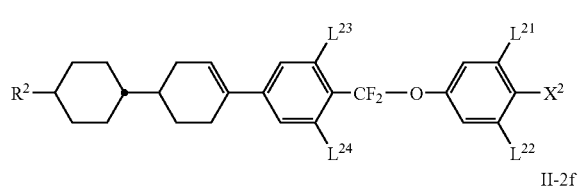
II-2e

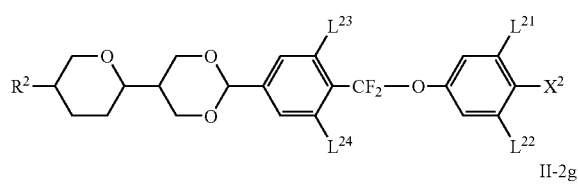
II-2f

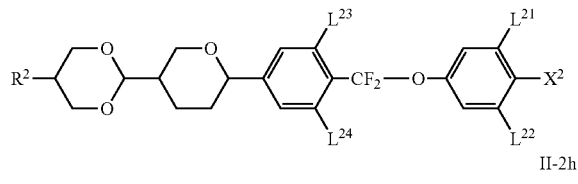
II-2g

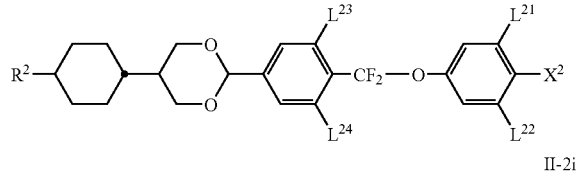
II-2h

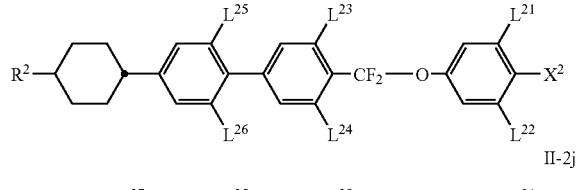
II-2i

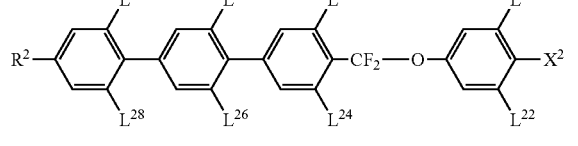
II-2j in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

Component B preferably comprises compounds which are selected from the group of the compounds of the formulae II-1a to II-1e in which $L^{21}$ and $L^{22}$ both denote F and/or $L^{23}$ and $L^{24}$ both denote F.

In a preferred embodiment, component B comprises compounds which are selected from the group of the compounds of the formulae II-1a to II-1i in which $L^{21}$, $L^{22}$, $L^{23}$ and $L^{24}$ all denote F.

Especially preferred compounds of the formula II-2 are the compounds of the following formulae:

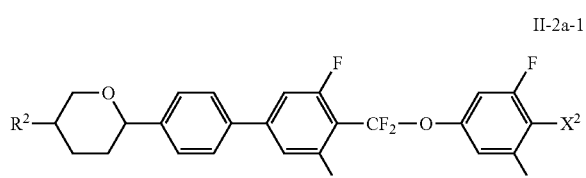
II-2a-1

II-2c-1

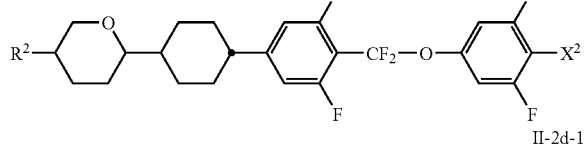
II-2d-1

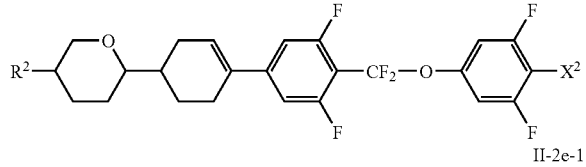
II-2e-1

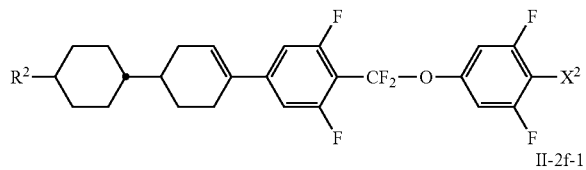
II-2f-1

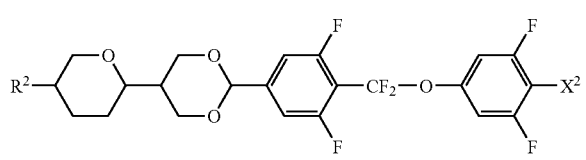
II-2h-1

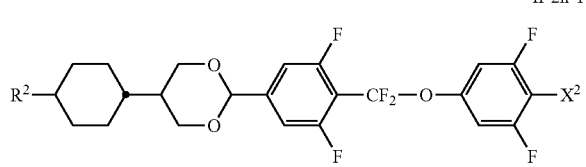
II-2i-1

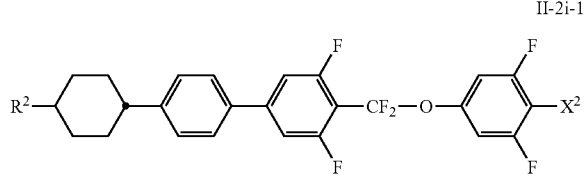

II-2i-2

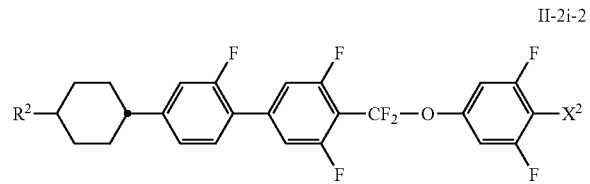

II-2j-1

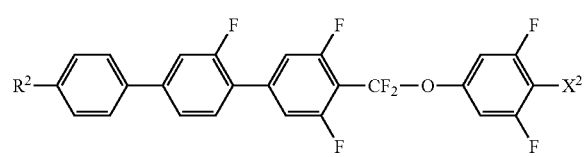

II-2j-2

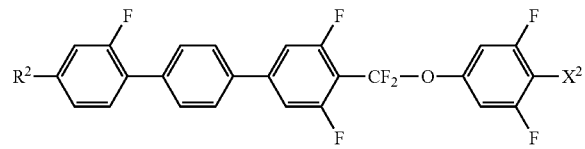

in which $R^2$ and $X^2$ have the meanings indicated above, and $X^2$ preferably denotes F.

Component B preferably comprises one or more compounds of the formula II-3. These compounds of the formula II-3 are preferably selected from the group of the compounds of the formulae II-3a to II-3c:

II-3a

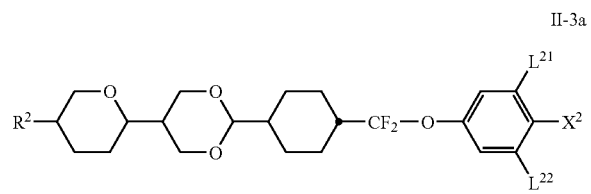

II-3b

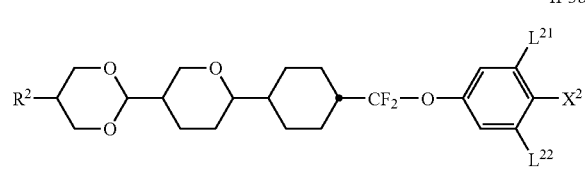

II-3c

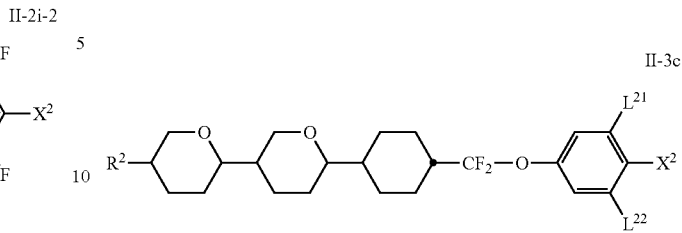

in which the parameters have the respective meanings indicated above, and $L^{21}$ and $L^{22}$ preferably both denote F.

In a preferred embodiment, component B comprises one or more compounds of the formula II-4, preferably of the formula II-4-a:

II-4a

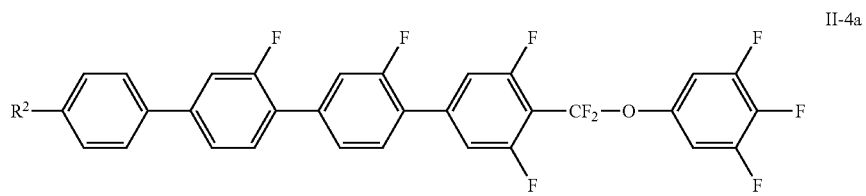

in which the parameters have the meaning given above, and $X^2$ preferably denotes F or $OCF_3$, particularly preferably F.

Component B preferably comprises one or more compounds of the formula III-1. The compounds of the formula III-1 are preferably selected from the group of the compounds of the formulae III-1a and III-1b:

III-1a

III-1b

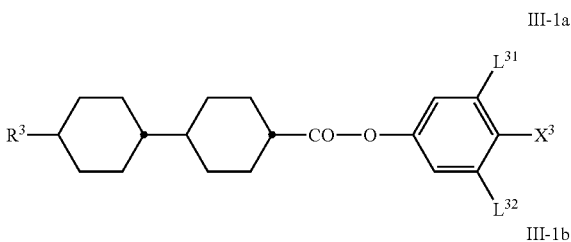

in which the parameters have the respective meanings indicated above, and the parameters $L^{33}$ and $L^{34}$, independently of one another and of the other parameters, denote H or F.

Component B preferably comprises one or more compounds of the formula III-1a, which are preferably selected from the group of the compounds of the formulae III-1a-1 to III-1a-6:

III-1a-1
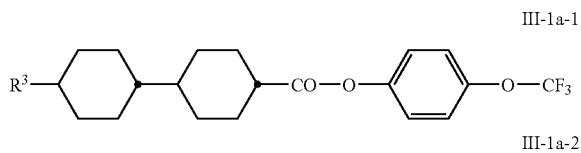

III-1a-2
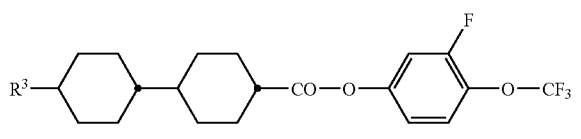

III-1a-3
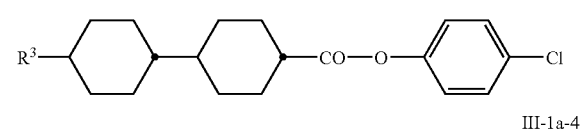

III-1a-4
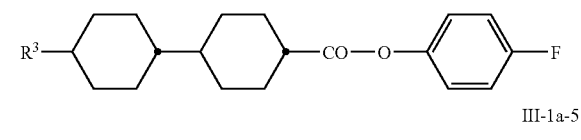

III-1a-5
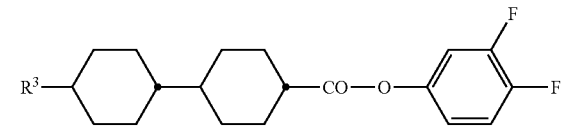

III-1a-6
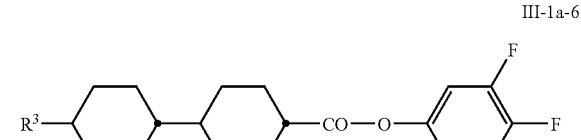

in which $R^3$ has the meaning indicated above.

Component B preferably comprises one or more compounds of the formula III-1b, which are preferably selected from the group of the compounds of the formulae III-1b-1 to III-1b-4, preferably III-1b-4:

III-1b-1
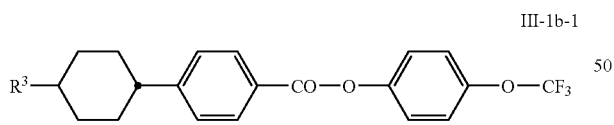

III-1b-2
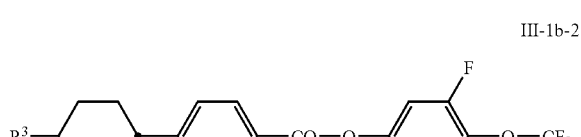

III-1b-3
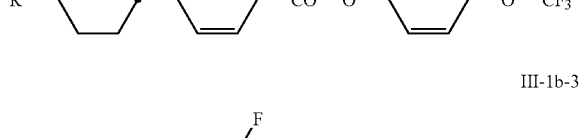

III-1b-4
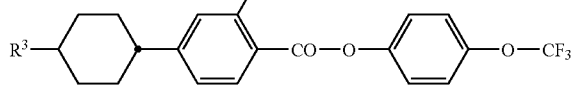

in which $R^3$ has the meaning indicated above.

Component B preferably comprises one or more compounds of the formula III-2. The compounds of the formula III-2 are preferably selected from the group of the compounds of the formulae III-2a to III-2j:

III-2a
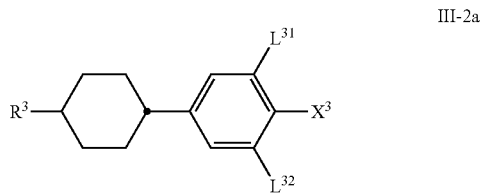

III-2b
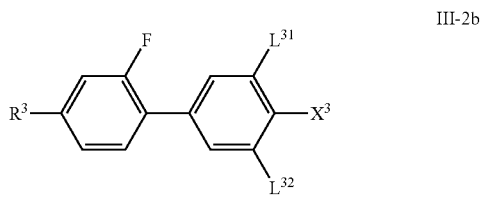

III-2c
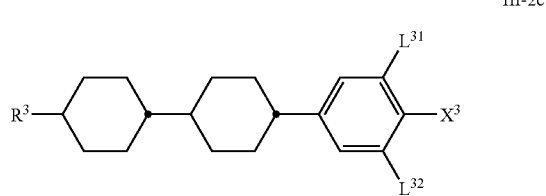

III-2d
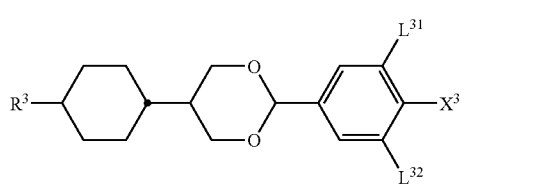

III-2e
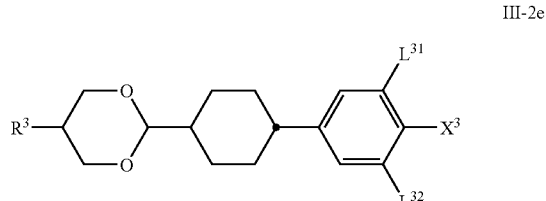

III-2f
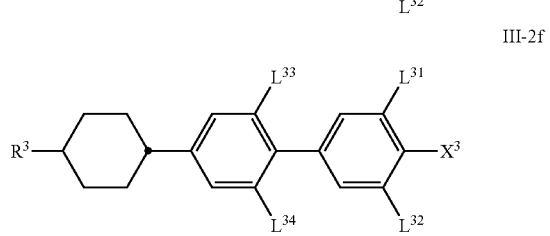

III-2g

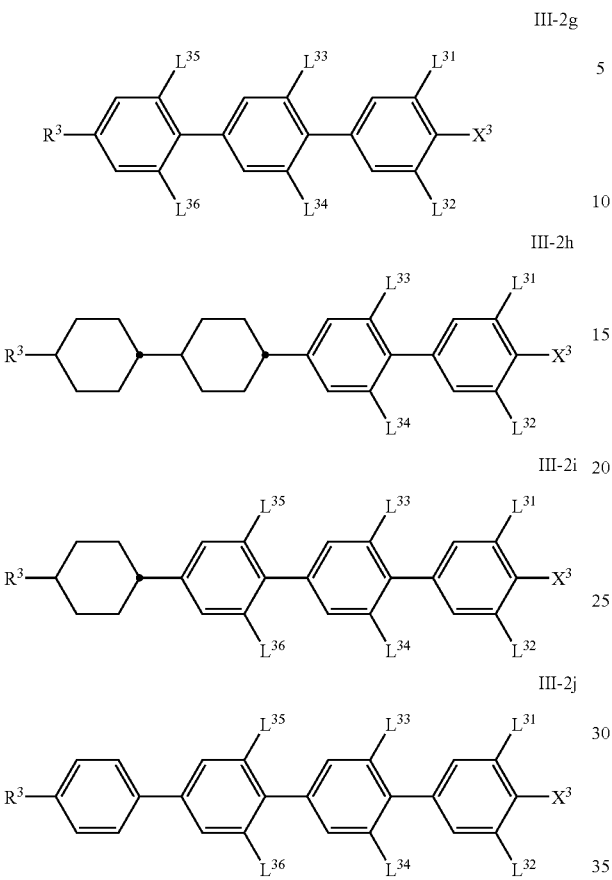

III-2h

III-2i

III-2j in which the parameters have the meaning given above and preferably in which the parameters have the respective meanings indicated above, and the parameters $L^{35}$ and $L^{36}$, independently of one another and of the other parameters, denote H or F.

Component B preferably comprises one or more compounds of the formula III-2a, which are preferably selected from the group of the compounds of the formulae III-2a-1 to III-2a-5:

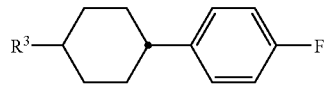

III-2a-1

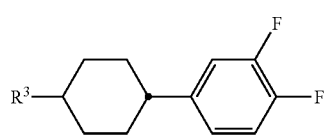

III-2a-2

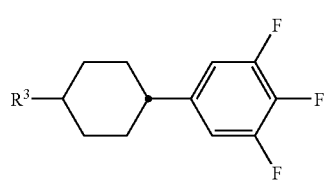

III-2a-3

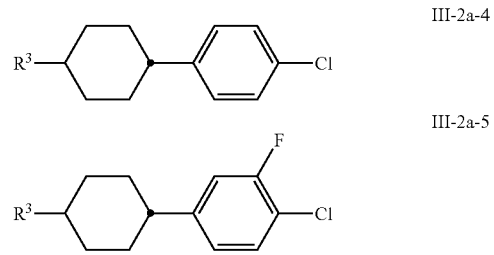

III-2a-4

III-2a-5 in which $R^3$ has the meaning indicated above.

Component B preferably comprises one or more compounds of the formula III-2b, which are preferably selected from the group of the compounds of the formulae III-2b-1 and III-2b-2, preferably III-2b-2:

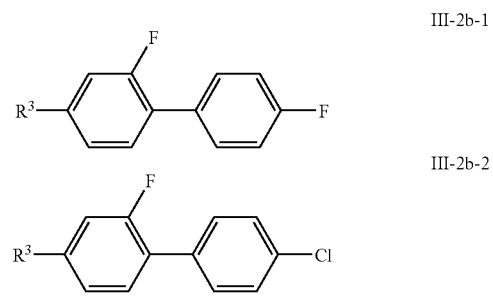

III-2b-1

III-2b-2 in which $R^3$ has the meaning indicated above.

Component B preferably comprises one or more compounds of the formula III-2c, which are preferably selected from the group of the compounds of the formulae III-2c-1 to III-2c-5:

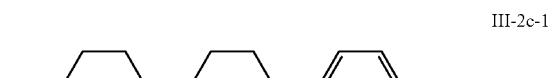

III-2c-1

III-2c-2

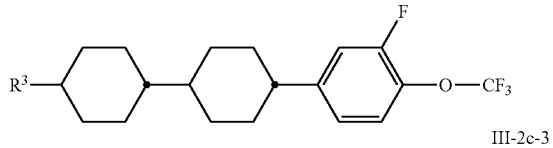

III-2c-3

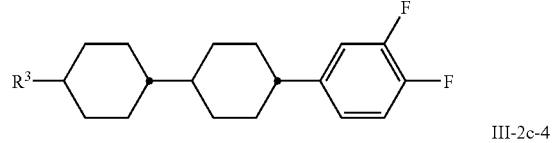

III-2c-4

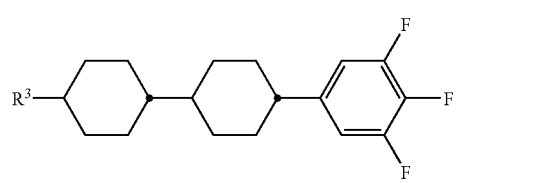

-continued

III-2c-5

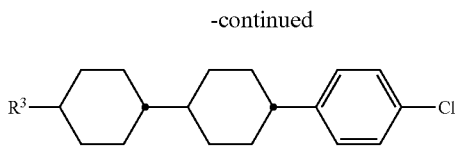

in which R³ has the meaning indicated above.

Component B preferably comprises one or more compounds selected from the group of the compounds of the formulae III-2d and III-2e, which are preferably selected from the group of the compounds of the formulae III-2d-1 and III-2e-1:

III-2d-1

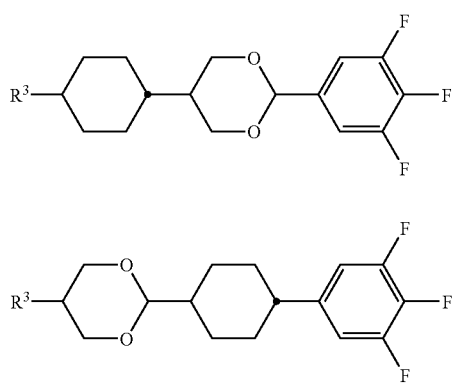

III-2e-1 in which R³ has the meaning indicated above.

Component B preferably comprises one or more compounds of the formula III-2f, which are preferably selected from the group of the compounds of the formulae III-2f-1 to III-2f-5:

III-2f-1

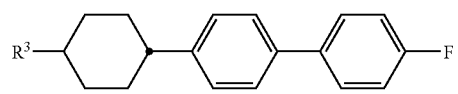

III-2f-2

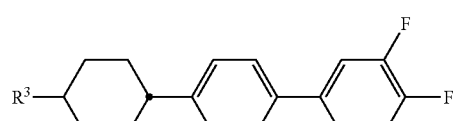

III-2f-3

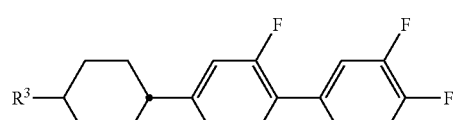

III-2f-4

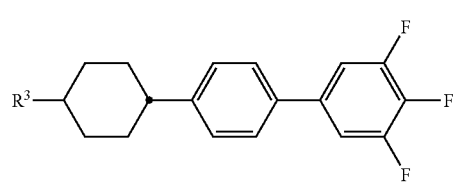

III-2f-5

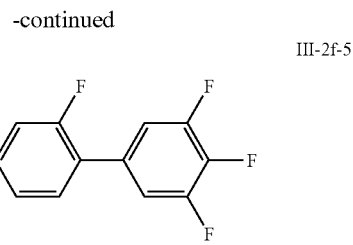

in which R³ has the meaning indicated above.

Component B preferably comprises one or more compounds of the formula III-2g, which are preferably selected from the group of the compounds of the formulae III-2g-1 to III-2g-5:

III-2g-1

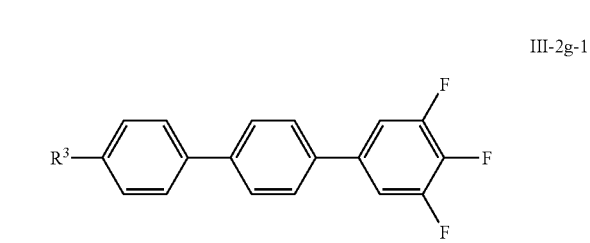

III-2g-2

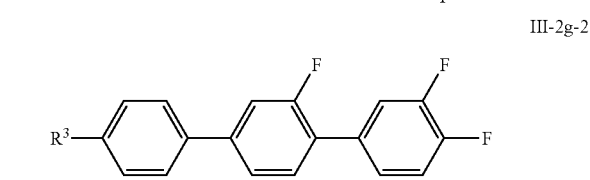

III-2g-3

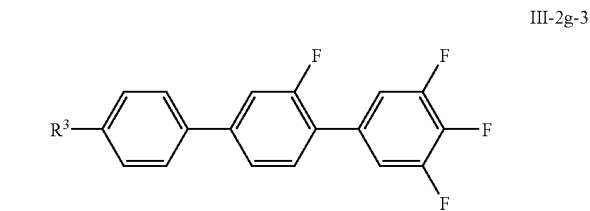

III-2g-4

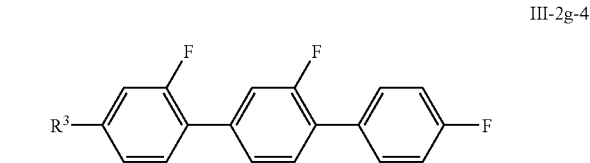

III-2g-5

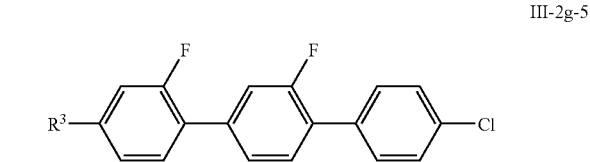

in which R³ has the meaning indicated above.

Component B preferably comprises one or more compounds of the formula III-2h, which are preferably selected from the group of the compounds of the formulae III-2h-1 to III-2h-3, preferably of the formula III-2h-3:

III-2h-1

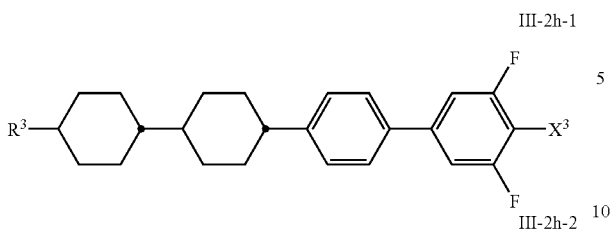

III-2h-2

III-2h-3

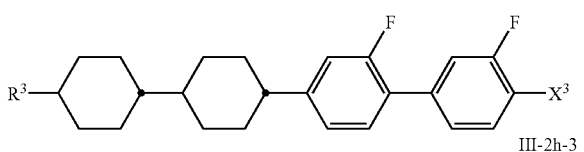

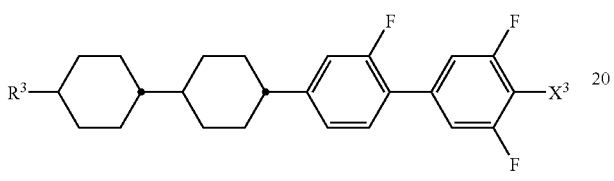

in which the parameters have the meaning given above, and $X^3$ preferably denotes F.

Component B preferably comprises one or more compounds of the formula III-2, which are preferably selected from the group of the compounds of the formulae III-2i-1 and III-2i-2, preferably of the formula III-2i-2:

III-2i-1

III-2i-2

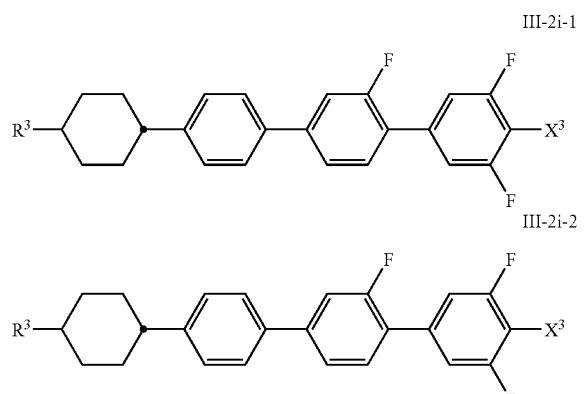

in which the parameters have the meaning given above, and $X^3$ preferably denotes F.

Component B preferably comprises one or more compounds of the formula III-2j, which are preferably selected from the group of the compounds of the formulae III-2j-1 and III-2j-2, preferably of the formula III-2j-1:

III-2j-1

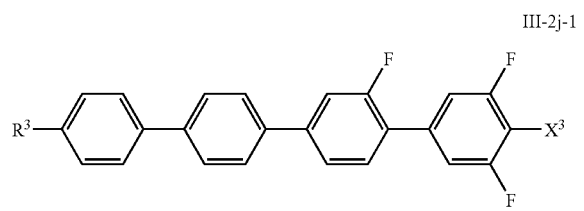

-continued

III-2j-2

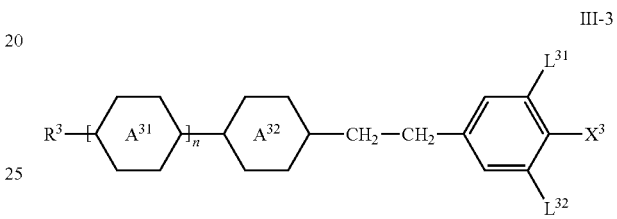

in which the parameters have the meaning given above.

Alternatively or in addition to the compounds of the formulae III-1 and/or III-2, the media according to the present invention may comprise one or more compounds of the formula III-3

III-3

$$R^3 - \left[ A^{31} \right]_n - A^{32} - CH_2 - CH_2 - \overset{L^{31}}{\underset{L^{32}}{\bigcirc}} - X^3$$

in which the parameters have the respective meanings indicated above under formula III.

These compounds are preferably selected from the group of the formulae III-3a and III-3b:

III-3a

III-3b

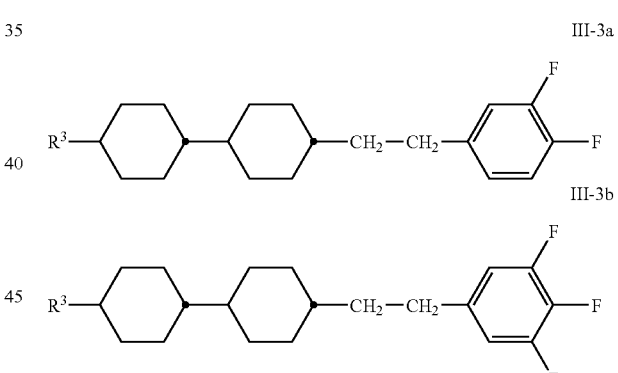

in which $R^3$ has the meaning indicated above.

The liquid-crystalline media according to the present invention preferably comprise a dielectrically neutral component, component C. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises, more preferably predominantly consists of, even more preferably essentially consists of and very preferably entirely consists of one or more dielectrically neutral compounds of the formula IV having a dielectric anisotropy in the range from −1.5 to 3.

The dielectrically neutral component, component C, preferably comprises one or more compounds selected from the group of the compounds of the formulae IV-1 to IV-6:

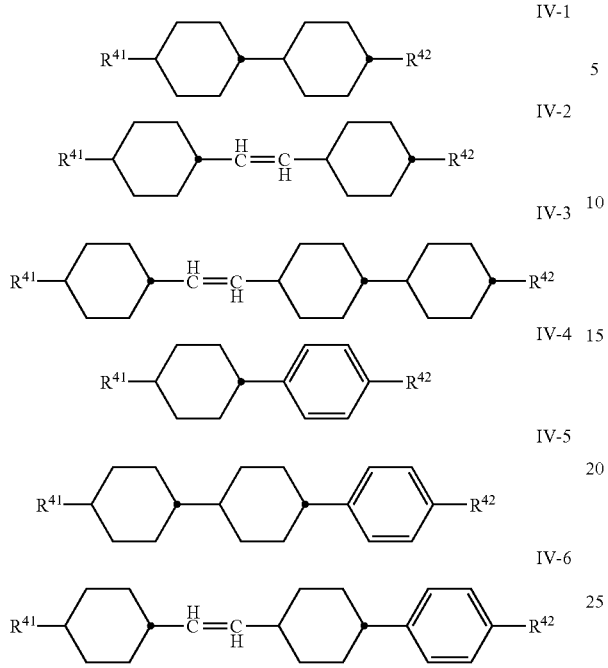

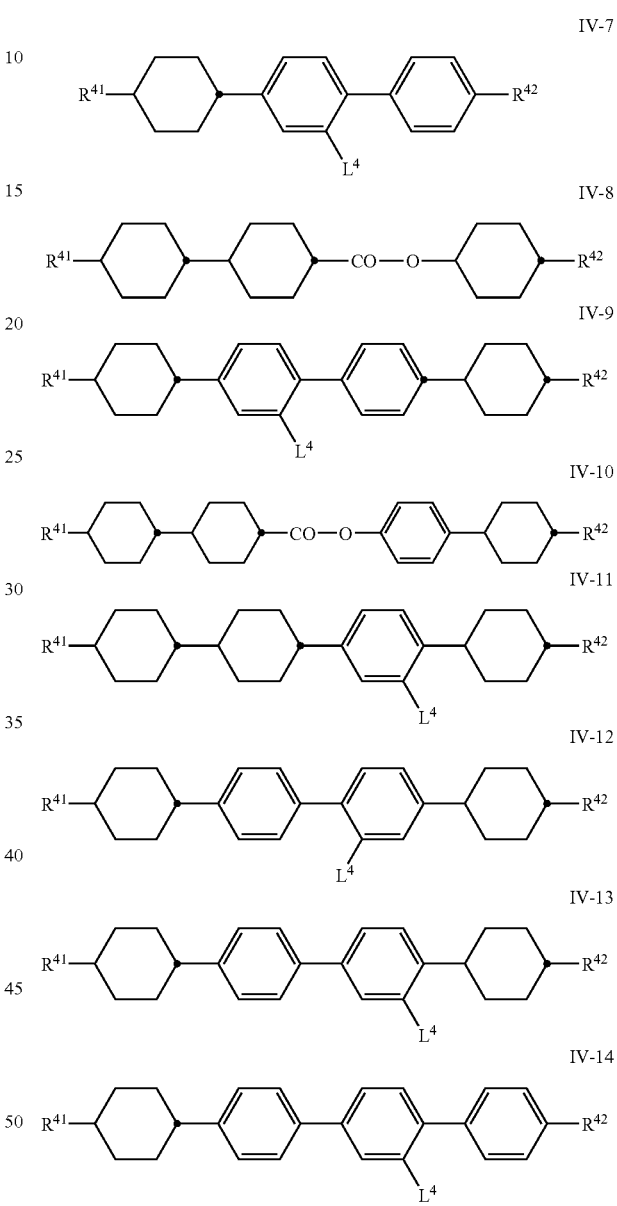

in which $R^{41}$ and $R^{42}$ have the respective meanings indicated above under formula IV, and in formulae IV-1, IV-5 and IV-6 $R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component C, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably one or more compounds of each of the formulae IV-1, IV-4 and IV-5 and very preferably one or more compounds of each of the formulae IV-1, IV-4, IV-5 and IV-6.

In a preferred embodiment, component C preferably comprises one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, component C preferably comprises one or more compounds of the formula IV-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise component C which comprises, preferably predominantly consists of and very preferably entirely consists of compounds of the formula IV selected from the group of the compounds of the formulae IV-1 to IV-6 as shown above and optionally of the formulae IV-7 to IV-14:

in which
$R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and
$L^4$ denotes H or F.

In a preferred embodiment, component C preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

Alternatively or in addition to the compounds of the formulae II and/or III, the media according to the present invention may comprise one or more dielectrically positive compounds of the formula V

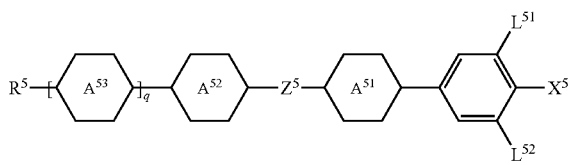

in which
$R^5$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably denotes alkyl or alkenyl,

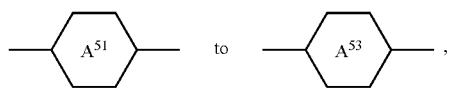

independently of one another, denote

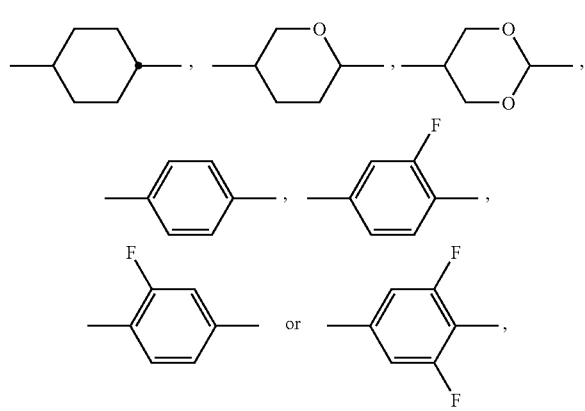

$L^{51}$ and $L^{52}$, independently of one another, denote H or F, $L^{51}$ preferably denotes F, and
$X^5$ denotes halogen, halogenated alkyl or alkoxy having 1 to 3 C atoms or halogenated alkenyl or alkenyloxy having 2 or 3 C atoms, preferably F, Cl, —$OCF_3$ or —$CF_3$, very preferably F, Cl or —$OCF_3$,
$Z^5$ denotes —$CH_2CH_2$—, —$CF_2CF_2$—, —COO—, trans-CH=CH—, trans-CF=CF—, —$CH_2O$— or —$CF_2O$—, preferably —$CH_2CH_2$—, —COO— or trans-CH=CH— and very preferably —COO— or trans-CH=CH—, and
q denotes 0 or 1.

The media according to the present invention preferably comprise one or more compounds of the formula V, preferably selected from the group of the compounds of the formulae V-1 and V-2:

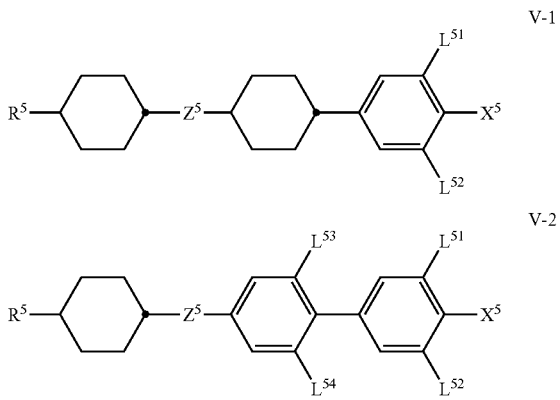

in which the parameters have the respective meanings indicated above, and the parameters $L^{53}$ and $L^{54}$, independently of one another and of the other parameters, denote H or F, and $Z^5$ preferably denotes —$CH_2$—$CH_2$—.

The compounds of the formula V-1 are preferably selected from the group of the compounds of the formulae V-1a and V-1b:

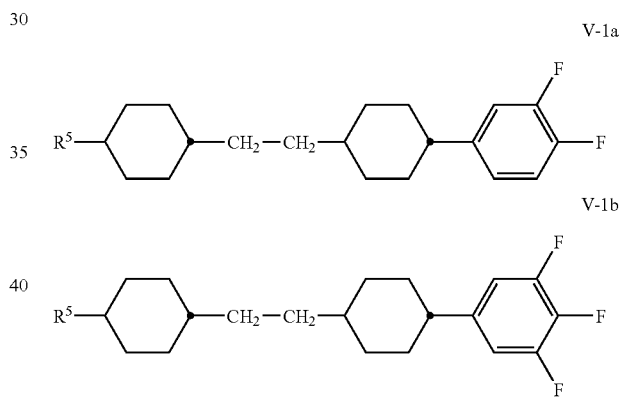

in which $R^5$ has the meaning indicated above.

The compounds of the formula V-2 are preferably selected from the group of the compounds of the formulae V-2a to V-2d:

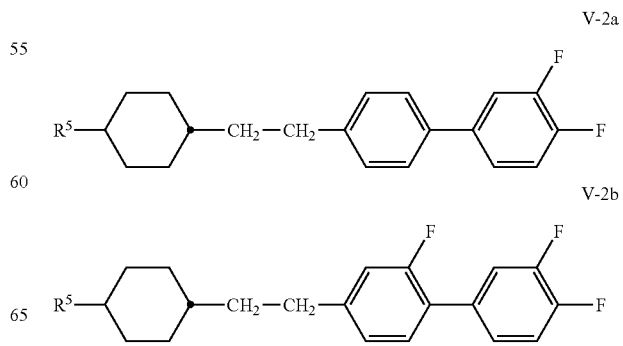

-continued

V-2c
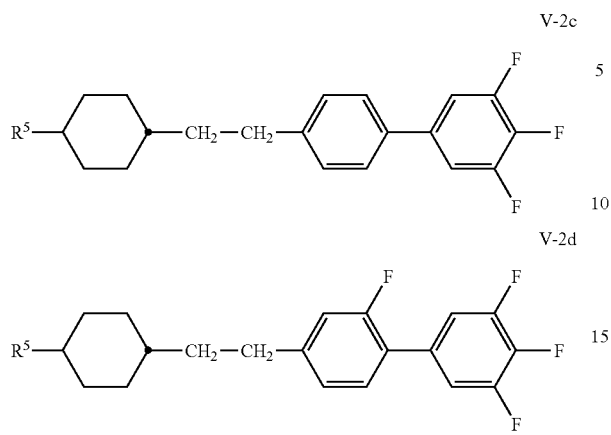

V-2d in which R⁵ has the meaning indicated above.

The liquid-crystalline media according to the present invention preferably comprise an additional dielectrically neutral component, component D. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises, more preferably predominantly consists of, even more preferably essentially consists of and very preferably entirely consists of one or more dielectrically neutral compounds of the formula VI having a dielectric anisotropy in the range from −1.5 to 3

VI
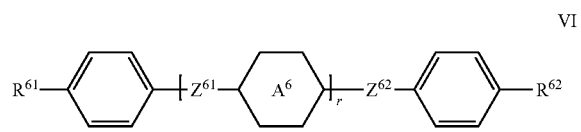

in which $R^{61}$ and $R^{62}$, independently of one another, have the meaning indicated above for $R^2$ under formula II, preferably $R^{61}$ denotes alkyl and $R^{62}$ denotes alkyl or alkenyl,

and if it occurs twice, independently of one another on each occurrence, denotes

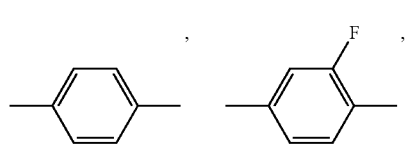

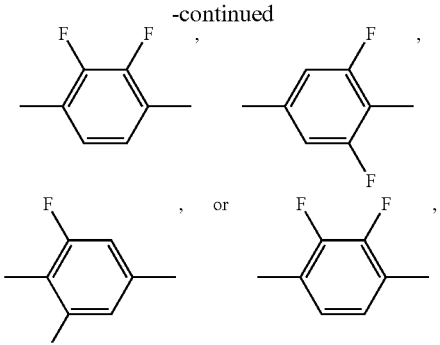

preferably one or more of

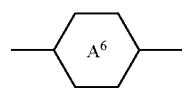

denote

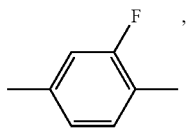

$Z^{61}$ and $Z^{62}$, independently of one another and, if $Z^{61}$ occurs twice, also these independently of one another, denote —CH₂CH₂—, —COO—, trans-CH=CH—, trans-CF=CF—, —CH₂O—, —CF₂O— or a single bond, preferably one or more of them denote(s) a single bond, and r denotes 0, 1 or 2, preferably 0 or 1, particularly preferably 1.

The dielectrically neutral component, component D, preferably comprises one or more compounds selected from the group of the compounds of the formulae VI-1 and VI-2:

VI-1
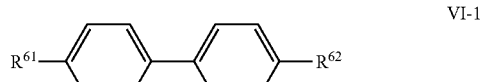

VI-2
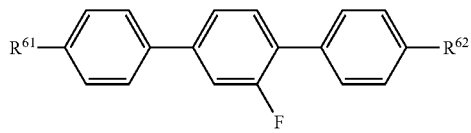

in which $R^{61}$ and $R^{62}$ have the respective meanings indicated above under formula VI, and $R^{61}$ preferably denotes alkyl, and in formula VI-1 $R^{62}$ preferably denotes alkenyl, preferably —(CH₂)₂—CH=CH—CH₃, and in formula VI-2 $R^{62}$ preferably denotes alkyl, —(CH₂)₂—CH=CH₂ or —(CH₂)₂—CH=CH—CH₃.

The dielectrically neutral component, component D, preferably comprises one or more compounds selected from the group of the compounds of the formulae VI-1 and VI-2, in which R$^{61}$ preferably denotes n-alkyl, and in formula VI-1 R$^{62}$ preferably denotes alkenyl, and in formula VI-2 R$^{62}$ preferably denotes n-alkyl.

In a preferred embodiment, component D preferably comprises one or more compounds of the formula VI-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, component D preferably comprises one or more compounds of the formula VI-2, more preferably of the sub-formulae PGP-n-m, PGP-n-2V and PGP-n-2Vm thereof, even more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

The liquid-crystal mixtures according to the present invention preferably comprise at least one further component besides components A and B. This third component may be one of components C and D; the third component present is preferably component C.

The mixtures according to the present invention may of course also comprise all four components A, B, C and D.

In addition, the liquid-crystal mixtures according to the present invention may comprise a further optional component, component E, which has negative dielectric anisotropy and comprises, preferably predominantly consists of, more preferably essentially consists of and very preferably entirely consists of dielectrically negative compounds, preferably of the formula VII

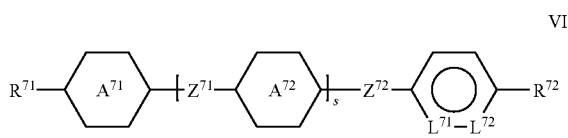

VII in which

R$^{71}$ and R$^{72}$, independently of one another, have the meaning indicated above for R$^2$ under formula II,

denotes

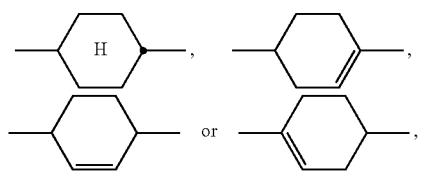

preferably

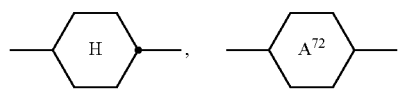

denotes

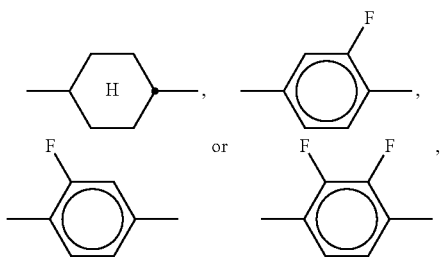

Z$^{71}$ and Z$^{72}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, L$^{71}$ and L$^{72}$, independently of one another, denote C—F or N, preferably one or more of them denote(s) C—F and very preferably both denote C—F, and s denotes 0 or 1.

In addition, the liquid-crystal mixtures according to the present invention may comprise a further optional component, component F, which has positive dielectric anisotropy and comprises, preferably predominantly consists of, more preferably essentially consists of and very preferably entirely consists of dielectrically positive compounds, preferably of the formula VIII

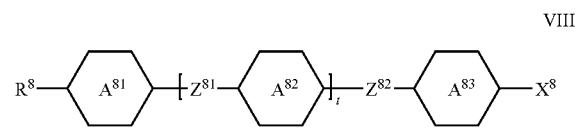

VIII in which

R$^8$ has the meaning indicated above for R$^2$ under formula II, one of

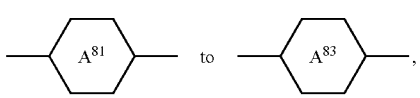

which is present, denotes

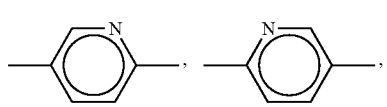

-continued

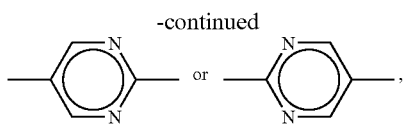

preferably

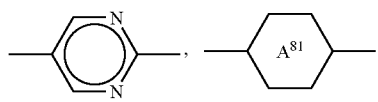

preferably denotes

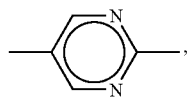

and the others have the same meaning or, independently of one another, denote

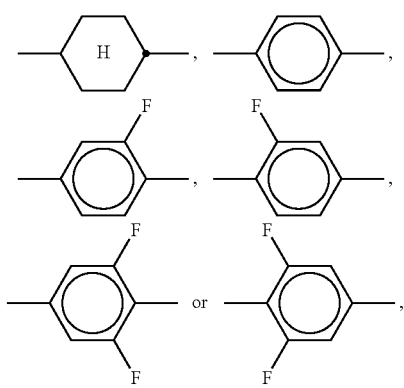

preferably

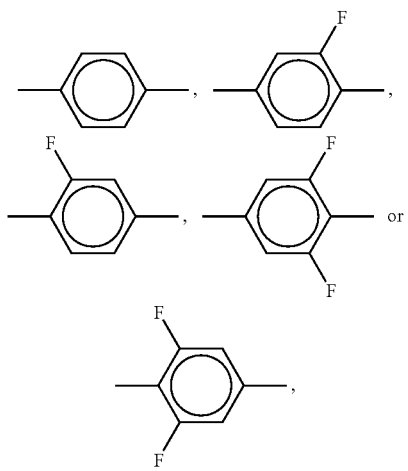

$Z^{81}$ and $Z^{82}$, independently of one another, denote —$CH_2CH_2$—, —COO—, trans-CH=CH—, trans-CF=CF—, —$CH_2O$—, —$CF_2O$— or a single bond, preferably one or more of them denote(s) a single bond and very preferably both denote a single bond, t denotes 0, 1 or 2, preferably 0 or 1, more preferably 1, and $X^8$ has the meaning indicated above for $X^2$ under formula II or alternatively, independently of $R^8$, may have the meaning indicated for $R^8$ and from which the compounds of the formula I are excluded.

The liquid-crystalline media according to the present invention preferably comprise, more preferably predominantly consist of, even more preferably essentially consist of and very preferably entirely consist of components A to E, preferably A to D and very preferably A to C, and in particular compounds selected from the group of the compounds of the formulae I to VIII, preferably I to V and very preferably I to III and/or IV.

In this application, comprise in connection with compositions means that the relevant entity, i.e. the medium or the component, comprises the component or components or the compound or compounds indicated, preferably in a total concentration of 10% or more and very preferably 20% or more.

In this connection, predominantly consist of means that the relevant entity comprises 55% or more, preferably 60% or more and very preferably 70% or more of the component or components or the compound or compounds indicated.

In this connection, essentially consist of means that the relevant entity comprises 80% or more, preferably 90% or more and very preferably 95% or more of the component or components or the compound or compounds indicated.

In this connection, entirely consist of means that the relevant entity comprises 98% or more, preferably 99% or more and very preferably 100.0% of the component or components or the compound or compounds indicated.

Component E preferably comprises, more preferably predominantly consists of and very preferably entirely consists of one or more compounds of the formula VII, preferably selected from the group of the compounds of the formulae VII-1 to VII-3:

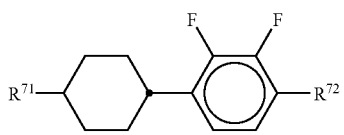

VII-1

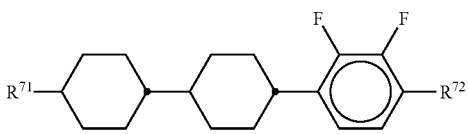

VII-2

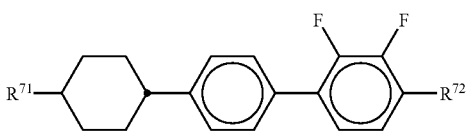

VII-3 in which $R^{71}$ and $R^{72}$ have the respective meanings indicated above under formula VII.

In formulae VII-1 to VII-3, $R^{71}$ preferably denotes n-alkyl or 1E-alkenyl and $R^{72}$ preferably denotes n-alkyl or alkoxy.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 60° C. or more, more preferably 65° C. or more, particularly preferably 70° C. or more and very particularly preferably 75° C. or more.

The nematic phase of the media according to the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The $\Delta\in$ of the liquid-crystal medium according to the invention, at 1 kHz and 20° C., is preferably 2 or more, more preferably 4 or more and very preferably 6 or more. In particular, $\Delta\in$ is 20 or less.

The $\Delta n$ of the liquid-crystal media according to the present invention, at 589 nm ($Na^D$) and 20° C., is preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a first preferred embodiment of the present application, the $\Delta n$ of the liquid-crystal media according to the present invention is preferably 0.080 or more, more preferably 0.090 or more.

In this first preferred embodiment of the present invention, the $\Delta n$ of the liquid-crystal media is preferably in the range from 0.090 or more to 0.120 or less, more preferably in the range from 0.095 or more to 0.115 or less and very particularly preferably in the range from 0.100 or more to 0.105 or less, while $\Delta\in$ is preferably in the range from 4 or more to 11 or less, preferably in the range from 5 or more to 9 or less and particularly preferably in the range from 6 or more to 8 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 95° C. or more.

In a second preferred embodiment of the present invention, the $\Delta n$ of the liquid-crystal media is in the range from 0.115 or more to 0.140 or less, more preferably in the range from 0.120 or more to 0.135 or less and very particularly preferably in the range from 0.125 or more to 0.130 or less, while $\Delta\in$ is preferably 6 or more, more preferably 7 or more and very preferably in the range from 8.5 or more to 10 or less.

In this embodiment, the nematic phase of the media according to the invention preferably extends at least from −20° C. or less to 70° C. or more, very preferably at least from −30° C. or less to 70° C. or more and in particular at least from −40° C. or less to 75° C. or more.

In a third preferred embodiment of the present invention, the $\Delta n$ of the liquid-crystal media is in the range from 0.070 or more to 0.120 or less, more preferably in the range from 0.075 or more to 0.115 or less and very particularly preferably in the range from 0.080 or more to 0.110 or less, while $\Delta\in$ is preferably 3.5 or more, preferably in the range from 4.0 or more to 7.0 or less, more preferably in the range from 4.5 or more to 6.0 or less and particularly preferably in the range from 5.0 or more to 5.5 or less.

In this embodiment, the nematic phase of the media according to the invention preferably extends at least from −20° C. or less to 75° C. or more, more preferably at least from −30° C. or less to 70° C. or more, very preferably at least from −30° C. or less to 75° C. or more and in particular at least from −30° C. or less to 80° C. or more.

In a fourth preferred embodiment of the present invention, which is particularly suitable for use of the displays in notebooks with 2.5 V drivers or with 3.3 V drivers, the $\Delta n$ of the liquid-crystal media is preferably in the range from 0.090 or more to 0.130 or less, more preferably in the range from 0.100 or more to 0.120 or less and very particularly preferably in the range from 0.115 or more to 0.120 or less, while $\Delta\in$ is preferably 10 or more and, for applications with 2.5 V drivers, is preferably in the range from 15 or more to 22 or less, more preferably in the range from 16 or more to 20 or less and particularly preferably in the range from 17 or more to 19 or less, and, for applications with 3.3 V drivers, is preferably in the range from 10 or more to 25 or less, more preferably in the range from 11 or more to 14 or less and particularly preferably in the range from 12 or more to 13 or less.

In this embodiment, the nematic phase of the media according to the invention preferably extends at least from −10° C. or less to 70° C. or more, more preferably at least from −30° C. or less to 75° C. or more and in particular at least from −40° C. or less to 80° C. or more.

In accordance with the present invention, component A is preferably used in a concentration of 1% to 50%, more preferably 1% to 30%, even more preferably 2% to 30% and very preferably 3% to 30% of the mixture as a whole.

Component B is preferably used in a concentration of 2% to 60%, more preferably 3% to 35%, even more preferably 4% to 20% and very preferably 5% to 15% of the mixture as a whole.

Component C is preferably used in a concentration of 5% to 70%, more preferably 20% to 65%, even more preferably 30% to 60% and very preferably 40% to 55% of the mixture as a whole.

Component D is preferably used in a concentration of 0% to 50%, more preferably 1% to 40%, even more preferably 5% to 30% and very preferably 10% to 20% of the mixture as a whole.

Component E is preferably used in a concentration of 0% to 30%, more preferably 0% to 15% and very preferably 1% to 10% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In the first preferred embodiment of the present invention mentioned above, component A is preferably used in a concentration of 1% to 65%, more preferably 3% to 60% and very preferably 5% to 57% of the mixture as a whole, while component D is preferably used in a concentration of 5% to 40%, more preferably 10% to 35% and very preferably 10% to 30% of the mixture as a whole.

In this preferred embodiment, the media preferably comprise one or more compounds of the formula VI and very particularly preferably of the formula VI-2.

Especially in the second preferred embodiment of the present invention mentioned above, component C preferably comprises one or more compounds of the formula IV, more preferably of the formula IV-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated below in Table D.

In a preferred embodiment, the concentration of the compound of the formula CC-3-V in the media according to the invention can be 50% to 65%, particularly preferably 55% to 60%.

The liquid-crystal media preferably comprise in total 50% to 100%, more preferably 70% to 100% and very preferably 80% to 100% and in particular 90% to 100% of components A, B, C and D, preferably of components A, B and C, which in turn comprise, preferably predominantly consist of and very preferably entirely consist of one or more of the compounds of the formulae IA, IB, IC, II, III, IV, V, VI and VII, preferably of the formulae IA, IB, IC, II, III, IV, V and VI.

In the present application, the expression dielectrically positive describes compounds or components where $\Delta\in>3.0$, dielectrically neutral describes those where $-1.5\leqq\Delta\in\leqq3.0$ and dielectrically negative describes those where $\Delta\in<-1.5$. $\Delta\in$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The layer thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\in$ is defined as $(\in_{\|}-\in_{\perp})$, while $\in_{av.}$ is $(\in_{\|}+2\in_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany and are quoted for a temperature of 20° C., unless expressly stated otherwise. The optical anisotropy (Δn) is determined at a wavelength of 589.3 nm. The dielectric anisotropy ($\Delta\in$) is determined at a frequency of 1 kHz. The threshold voltages, as well as all other electro-optical properties, are determined using test cells produced at Merck KGaA, Germany. The test cells for the determination of $\Delta\in$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\in_{\|}$) and polyimide AL-1054 from Japan Synthetic Rubber, Japan, for homogeneous orientation ($\in_{\perp}$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while table B shows the linking groups. Table C gives the meanings of the codes for the left-hand or right-hand end groups. Table D shows illustrative structures of compounds together with their respective abbreviations.

TABLE A

| | Ring elements |
|---|---|
| C | cyclohexane-1,4-diyl |
| D | 1,3-dioxane-2,5-diyl |
| D1 | 1,3-dioxane-5,2-diyl |
| A | tetrahydropyran-2,5-diyl |
| A1 | tetrahydropyran-5,2-diyl |
| P | 1,4-phenylene |
| G | 3-fluoro-1,4-phenylene |
| G1 | 2-fluoro-1,4-phenylene |
| U | 3,5-difluoro-1,4-phenylene |
| U1 | 2,6-difluoro-1,4-phenylene |
| Y | 2,3-difluoro-1,4-phenylene |
| M | pyrimidine-2,5-diyl |
| M1 | pyrimidine-5,2-diyl |
| N | pyridine-2,5-diyl |
| N1 | pyridine-5,2-diyl |
| Np | naphthalene-2,6-diyl |
| N3f | trifluoronaphthalene-2,6-diyl |
| N3f1 | trifluoronaphthalene-6,2-diyl |
| tH | tetrahydronaphthalene-2,6-diyl |
| tH1 | tetrahydronaphthalene-6,2-diyl |
| tH2f | difluoro-tetrahydronaphthalene-2,6-diyl |
| tH2f1 | difluoro-tetrahydronaphthalene-6,2-diyl |
| dH | decahydronaphthalene-2,6-diyl |

TABLE A-continued

Ring elements

| | |
|---|---|
| K | 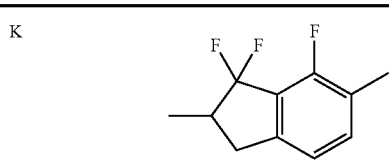 |
| Kl | 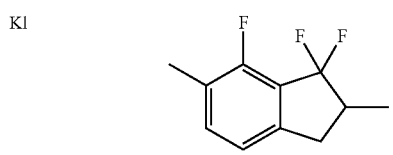 |
| L | 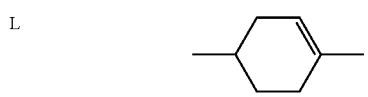 |
| Ll | 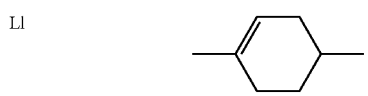 |
| F | 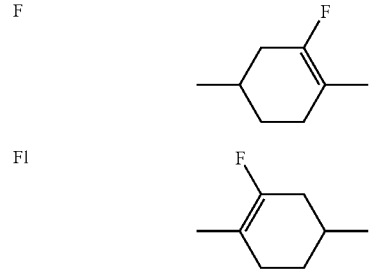 |
| Fl | |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| | | Use alone | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$ | -M | —CFH$_2$— |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| | | Use together with others | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are spacers for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

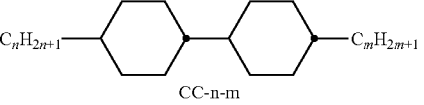
CC-n-m

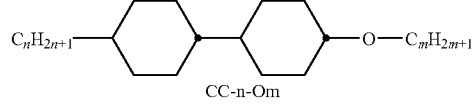
CC-n-Om

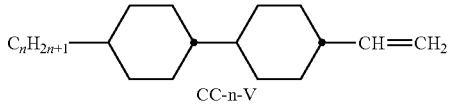
CC-n-V

CC-n-Vm

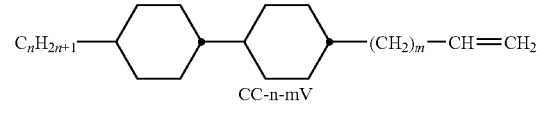
CC-n-mV

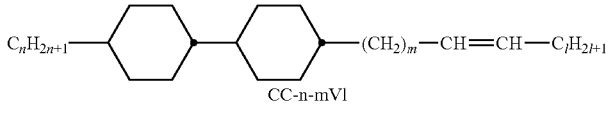
CC-n-mVl

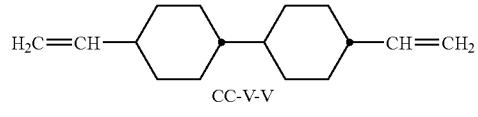
CC-V-V

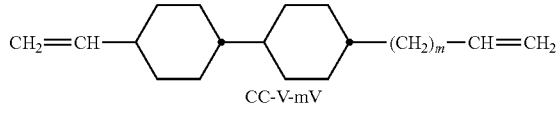
CC-V-mV

CC-V-Vm

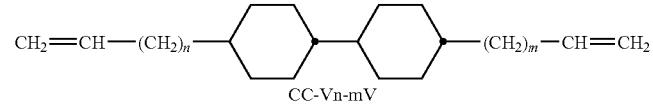
CC-Vn-mV

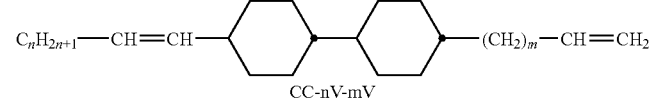
CC-nV-mV

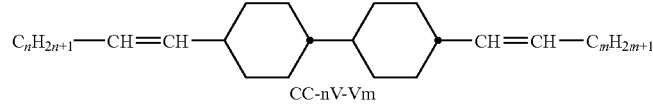
CC-nV-Vm

TABLE D-continued
Illustrative structures
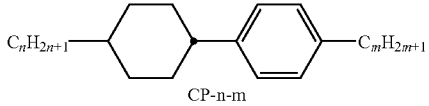
CP-n-m
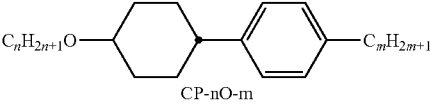
CP-nO-m
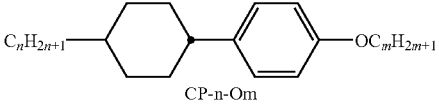
CP-n-Om
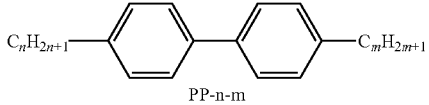
PP-n-m
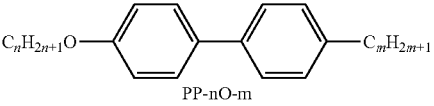
PP-nO-m
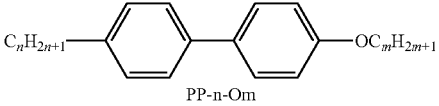
PP-n-Om
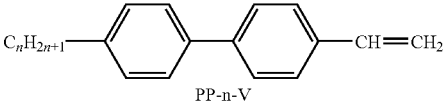
PP-n-V
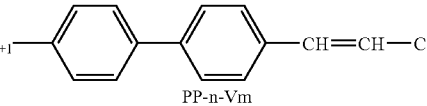
PP-n-Vm
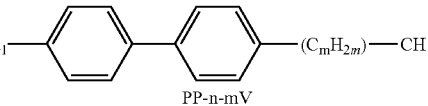
PP-n-mV
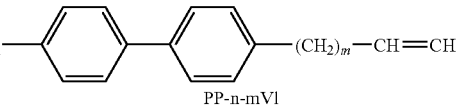
PP-n-mVl
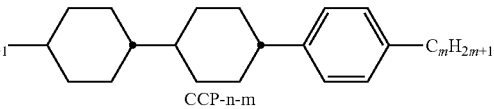
CCP-n-m
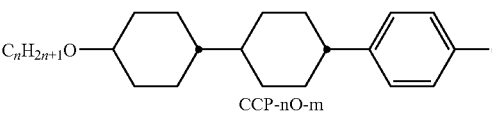
CCP-nO-m
CCP-n-Om TABLE D-continued
Illustrative structures
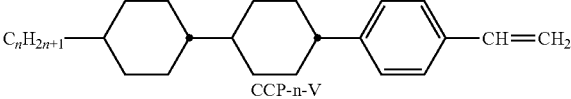
CCP-n-V
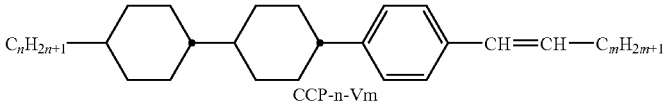
CCP-n-Vm
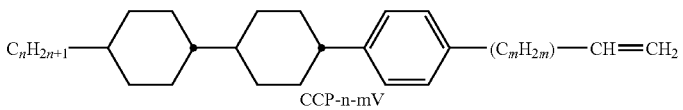
CCP-n-mV
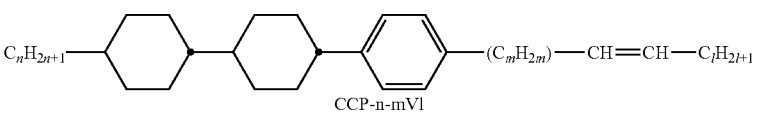
CCP-n-mVl
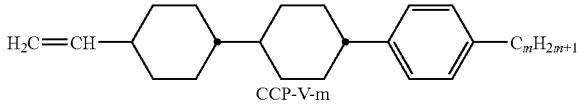
CCP-V-m
CCP-nV-m
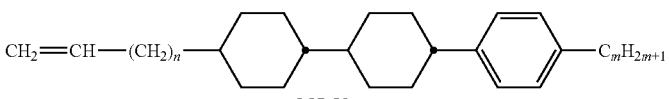
CCP-Vn-m
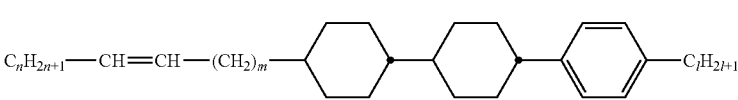
CCP-nVm-l
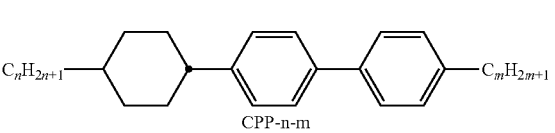
CPP-n-m
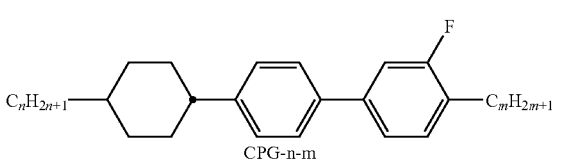
CPG-n-m
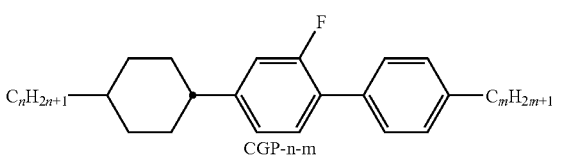
CGP-n-m
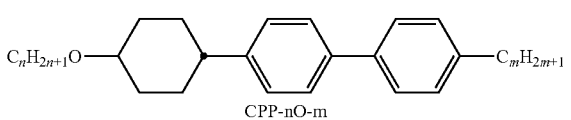
CPP-nO-m TABLE D-continued Illustrative structures $C_nH_{2n+1}$—⌬—⌬—⌬—$OC_mH_{2m+1}$
CPP-n-Om $H_2C$=$CH$—⌬—⌬—⌬—$C_mH_{2m+1}$
CPP-V-m $C_nH_{2n+1}$—$CH$=$CH$—⌬—⌬—⌬—$C_mH_{2m+1}$
CPP-nV-m $CH_2$=$CH$—$(C_nH_{2n})$—⌬—⌬—⌬—$C_mH_{2m+1}$
CPP-Vn-m $C_nH_{2n+1}$—$CH$=$CH$—$(C_mH_{2m})$—⌬—⌬—⌬—$C_lH_{2l+1}$
CPP-nVm-l $C_nH_{2n+1}$—⌬—⌬(F)—⌬—$C_mH_{2m+1}$
PGP-n-m $C_nH_{2n+1}$—⌬—⌬(F)—⌬—$(CH_2)_m$—$CH$=$CH_2$
PGP-n-mV $C_nH_{2n+1}$—⌬—⌬(F)—⌬—$(CH_2)_m$—$CH$=$CH$—$C_lH_{2l+1}$
PGP-n-mVl $C_nH_{2n+1}$—⌬—⌬—⌬—⌬—$C_mH_{2m+1}$
CPPC-n-m $C_nH_{2n+1}$—⌬—⌬—⌬(F)—⌬—$C_mH_{2m+1}$
CGPC-n-m $C_nH_{2n+1}$—⌬—⌬—⌬—⌬—$C_mH_{2m+1}$
CCPC-n-m $C_nH_{2n+1}$—⌬—⌬—$CO$—$O$—⌬—⌬—$C_mH_{2m+1}$
CCZPC-n-m TABLE D-continued
Illustrative structures
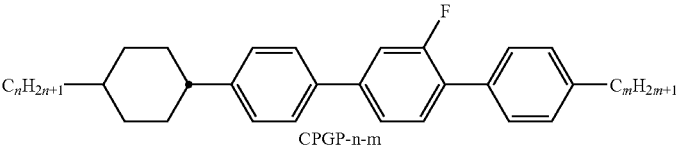
CPGP-n-m
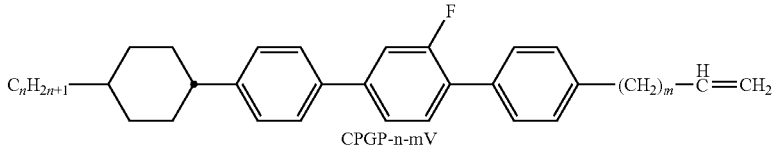
CPGP-n-mV
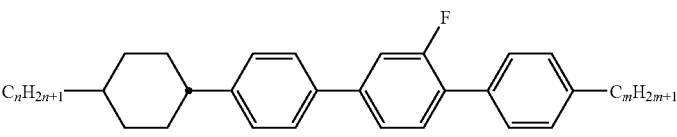
(unlabeled)
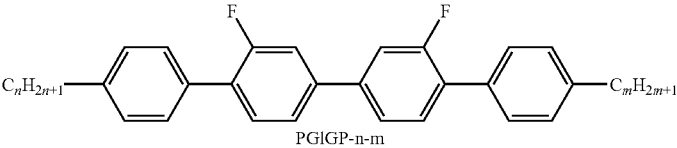
CPGP-n-mVl
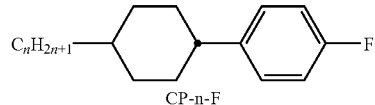
PGIGP-n-m
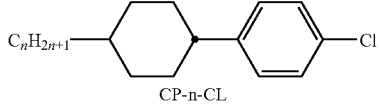
CP-n-F
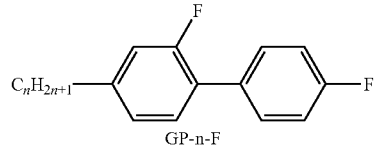
CP-n-CL
GP-n-F
GP-n-CL
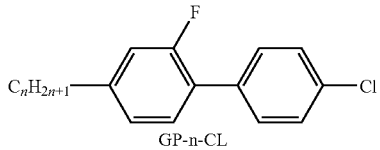
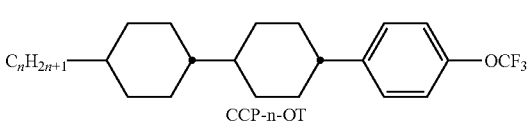
CCP-n-OT TABLE D-continued Illustrative structures $C_nH_{2n+1}$—[Cy]—[Cy]—[Ph(3-F, 4-OCF$_3$)]
CCG-n-OT $C_nH_{2n+1}$—[Cy]—[Cy]—[Ph(3,4-F)]
CCG-n-F $H_2C=CH$—[Cy]—[Cy]—[Ph(3,4-F)]
CCG-V-F $H_2C=CH$—[Cy]—[Cy]—[Ph(3,4-F)]
CCG-V-F $C_nH_{2n+1}$—[Cy]—[Cy]—[Ph(3,4,5-F)]
CCU-n-F $C_nH_{2n+1}$—[Cy]—[Dioxane]—[Ph(3,4,5-F)]
CDU-n-F $C_nH_{2n+1}$—[Cy]—[Ph]—[Ph(3,4-F)]
CPG-n-F $C_nH_{2n+1}$—[Cy]—[Ph]—[Ph(3,4,5-F)]
CPU-n-F TABLE D-continued
Illustrative structures
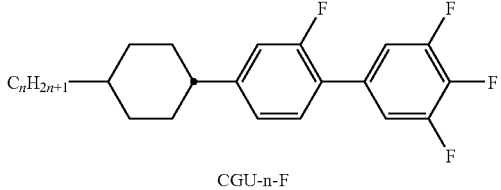
CGU-n-F
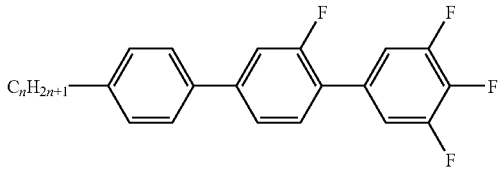
PGU-n-F
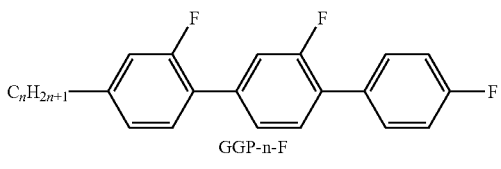
GGP-n-F
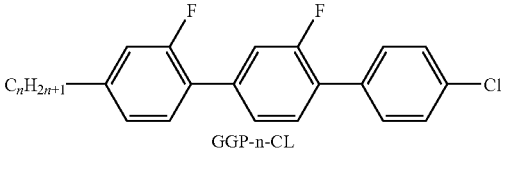
GGP-n-CL
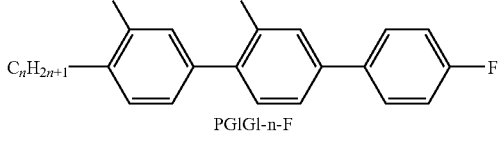
PGIGl-n-F
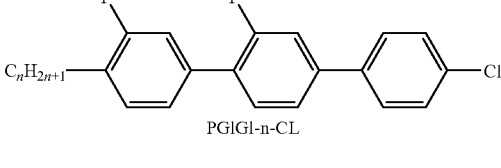
PGIGl-n-CL
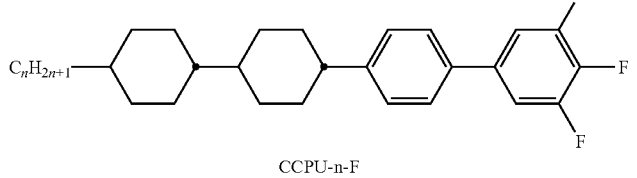
CCPU-n-F
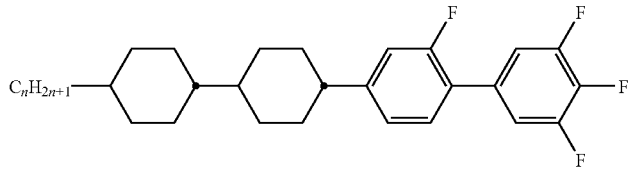
CCGU-n-F TABLE D-continued
Illustrative structures
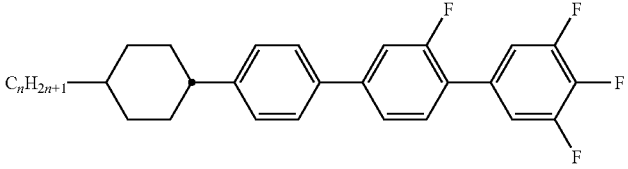
CPGU-n-F
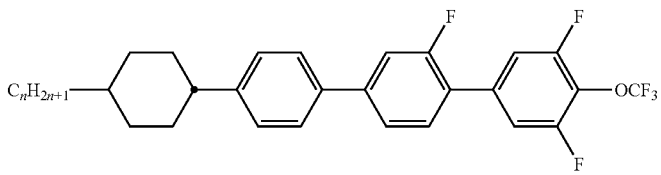
CPGU-n-OT
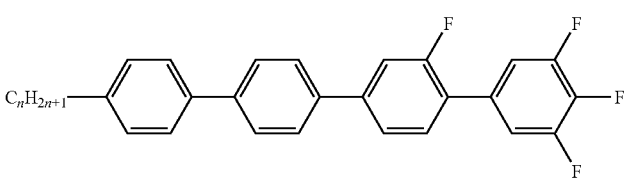
PPGU-n-F
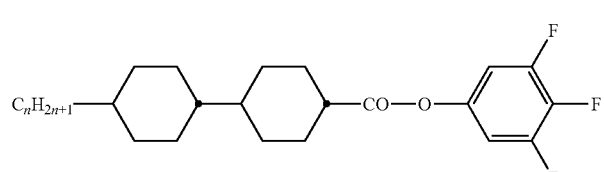
CCZU-n-F
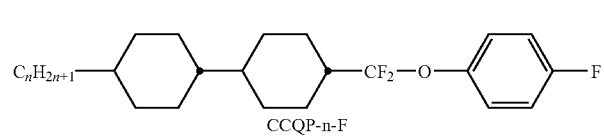
CCQP-n-F
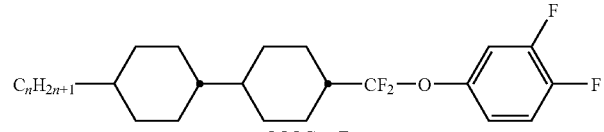
CCQG-n-F
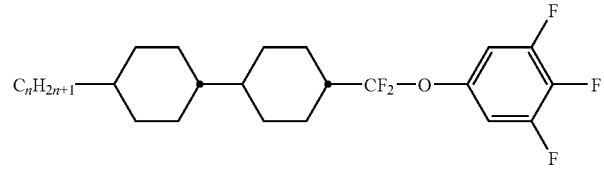
CCQU-n-F
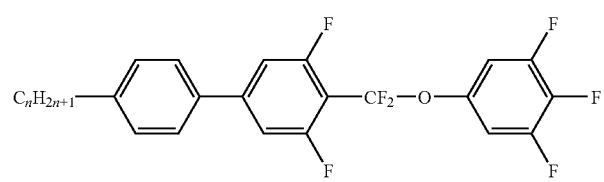
PUQU-n-F TABLE D-continued
Illustrative structures
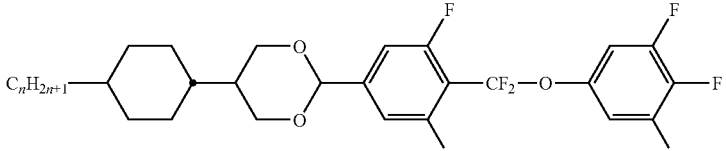
CDUQU-n-F
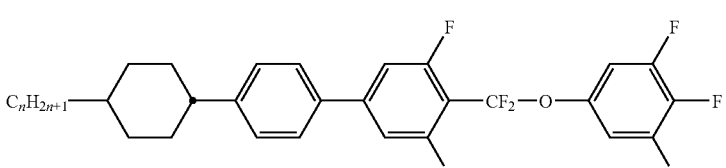
CPUQU-n-F
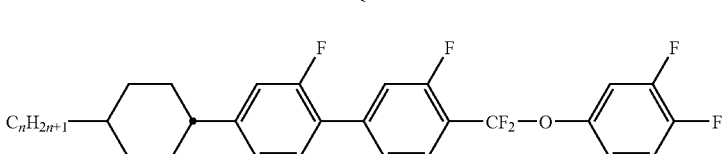
CGUQU-n-F
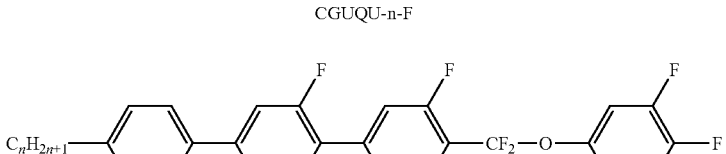
PGUQU-n-F
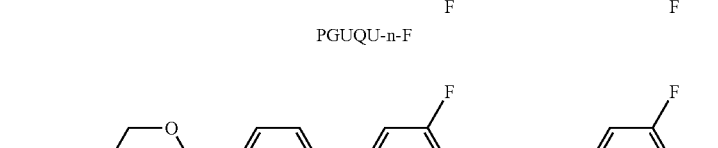
APUQU-n-F
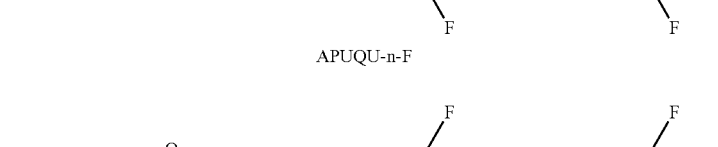
DPUQU-n-F
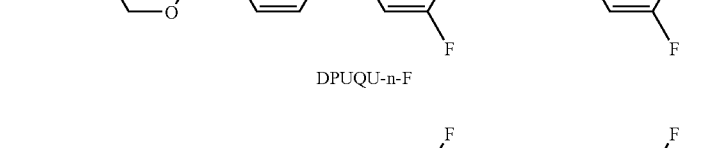
ADUQU-n-F TABLE D-continued Illustrative structures DAUQU-n-F CLUQU-n-F ALUQU-n-F DLUQU-n-F LGPQU-n-F The following table, Table E, shows illustrative compounds which can be used as stabiliser in the mesogenic media according to the present invention.

TABLE E

TABLE E-continued

TABLE E-continued
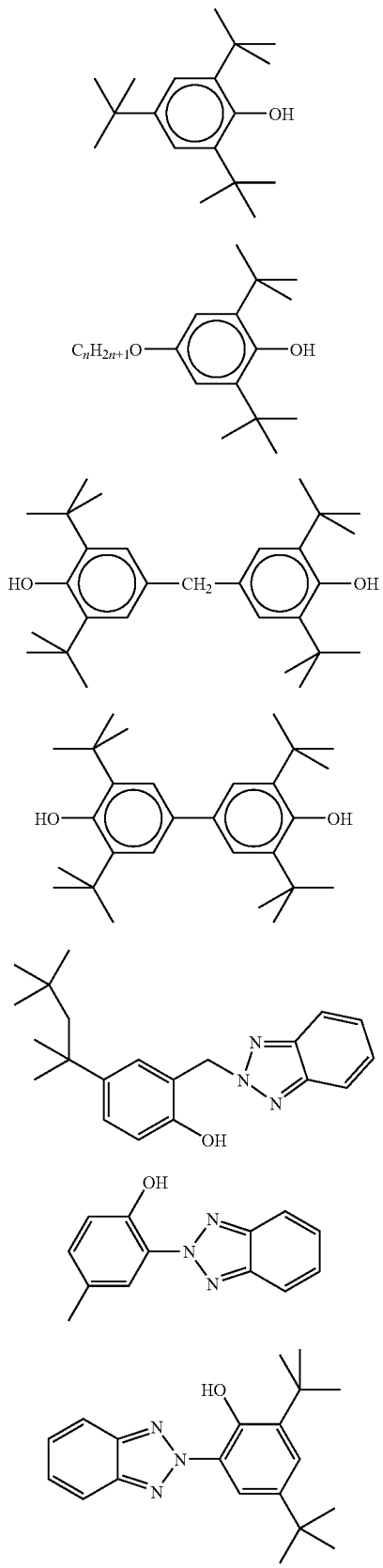
TABLE E-continued
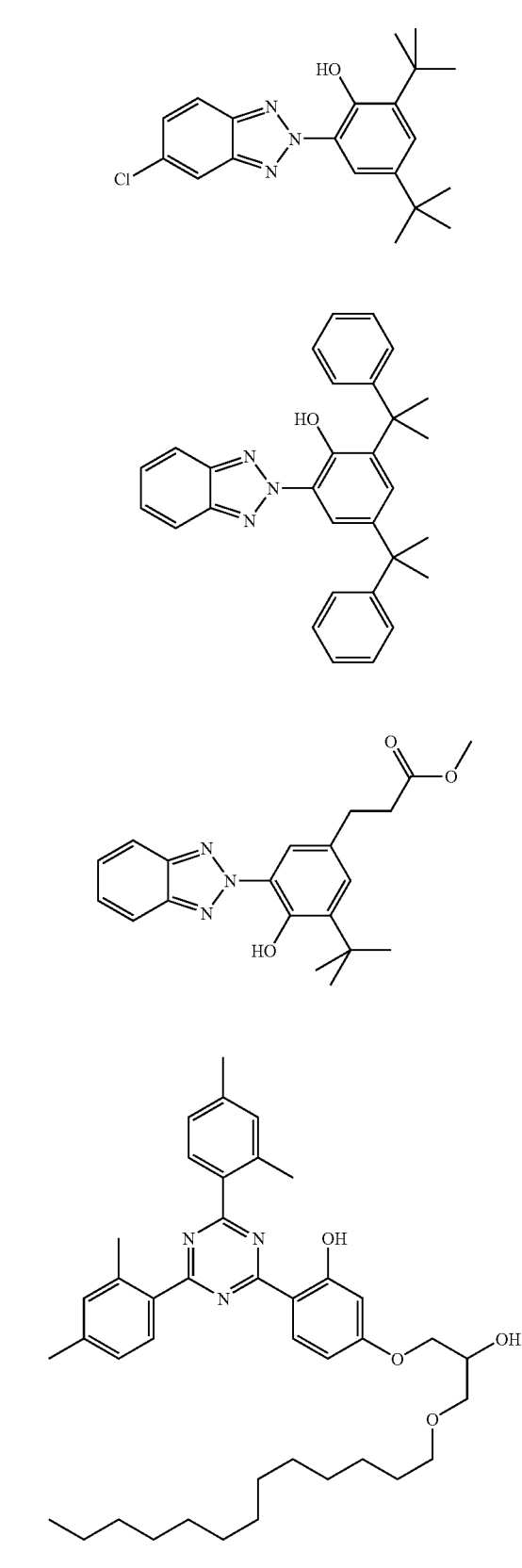

TABLE E-continued
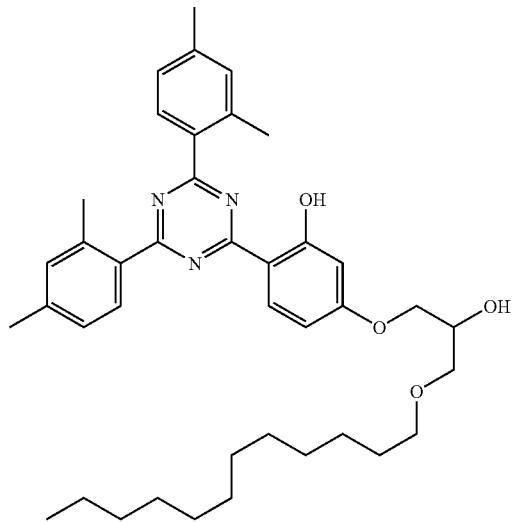
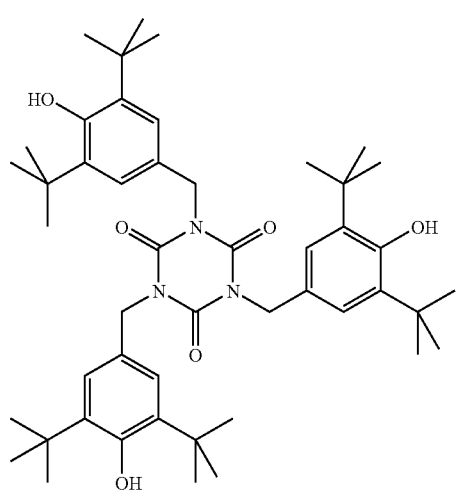
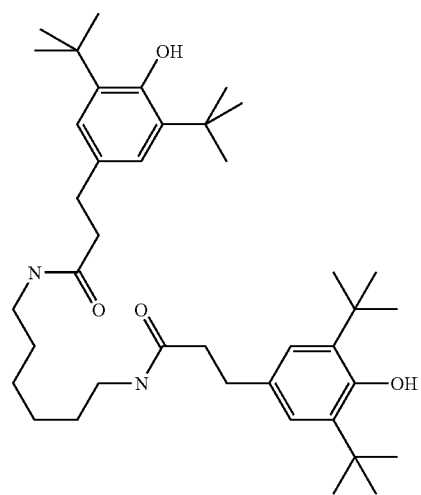
TABLE E-continued
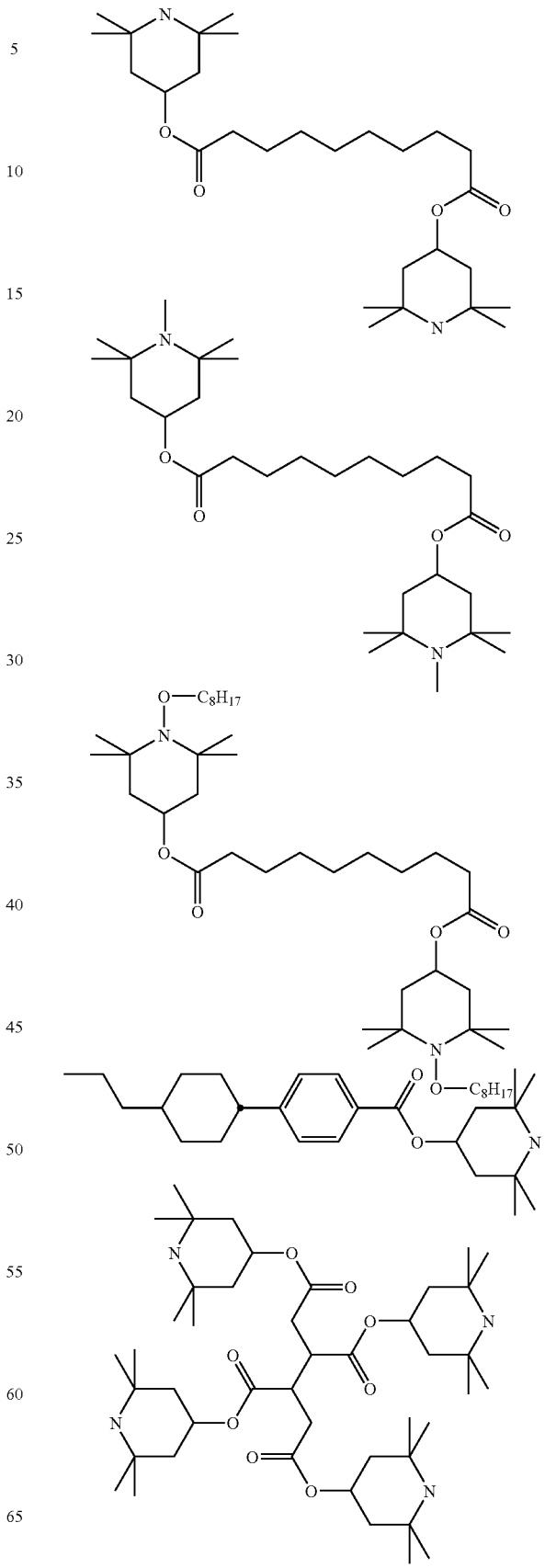

TABLE E-continued

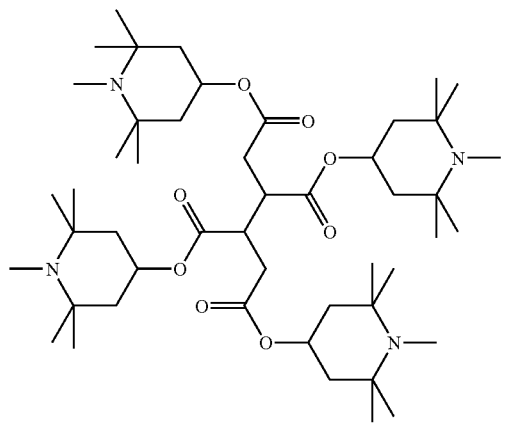

TABLE E-continued

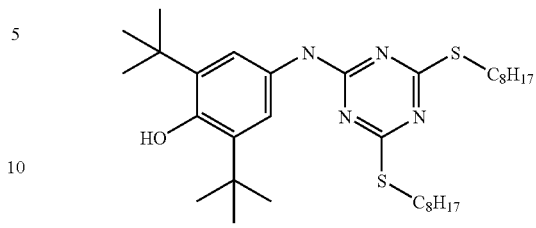

In a preferred embodiment of the present invention, the mesogenic media comprise one or more compounds selected from the group of the compounds from Table E.

The following table, Table F, shows illustrative compounds which can preferably be used as chiral dopants in the mesogenic media according to the present invention.

TABLE F

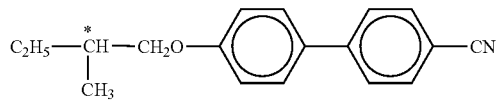

C 15

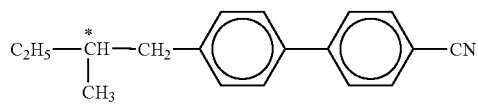

CB 15

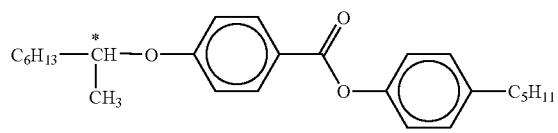

CM 21

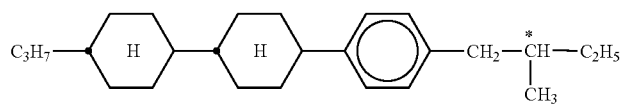

CM 44

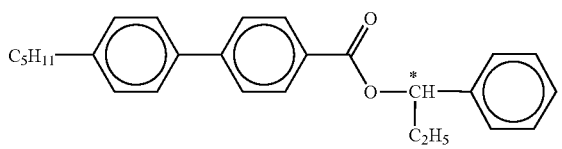

CM 45

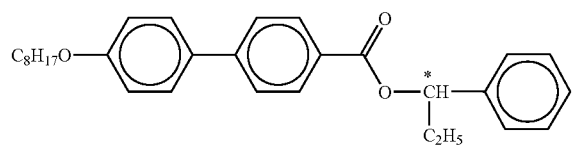

CM 47

TABLE F-continued
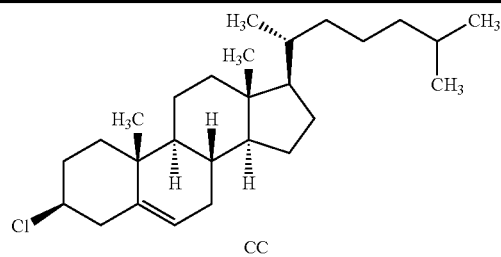
CC
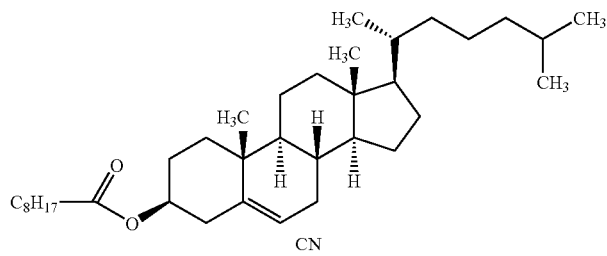
CN
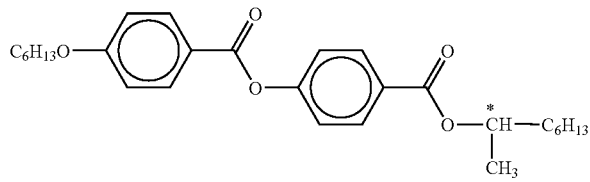
R/S-811
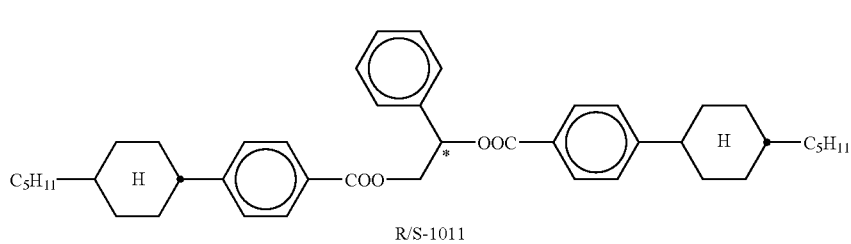
R/S-1011
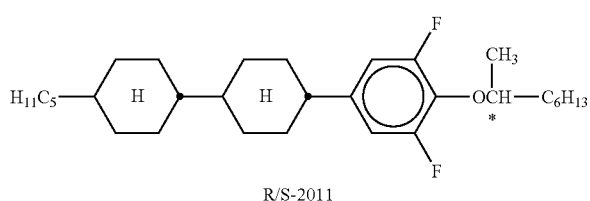
R/S-2011
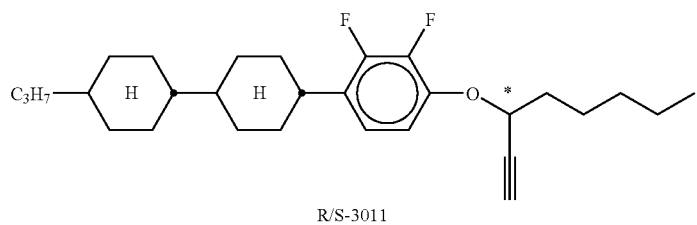
R/S-3011
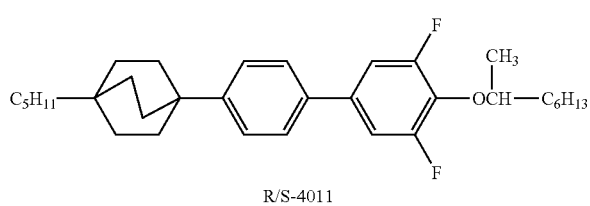
R/S-4011

TABLE F-continued

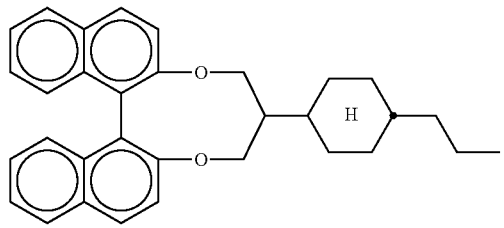

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise
  seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Example 1

A liquid-crystal mixture having the composition and properties as indicated in the following table is prepared.

| Composition Compound | | |
|---|---|---|
| No. | Abbreviation | |
| 1 | CPGU-3-OT | 5.0 |
| 2 | PGUQU-3-F | 7.0 |
| 3 | APUQU-2-F | 5.0 |
| 4 | APUQU-3-F | 7.0 |
| 5 | CCQU-3-F | 9.0 |
| 6 | CC-3-V | 43.5 |
| 7 | CCP-V-1 | 14.0 |
| 8 | CCP-V2-1 | 5.5 |
| 9 | PGP-2-3 | 2.0 |
| 10 | PGP-2-4 | 2.0 |
| Σ | | 100.0 |

Physical properties

| | |
|---|---|
| T(N, I) = | 94.5° C. |
| Δn (20° C., 589.3 nm) = | 0.1020 |
| $\epsilon_\parallel$ (20° C., 1 kHz) = | 10.2 |
| Δε (20° C., 1 kHz) = | 7.2 |
| $\gamma_1$ (20° C.) = | 74 mPa·s |
| $V_{10}$ (20° C.) = | 1.75 V |
| $V_{90}$ (20° C.) = | 2.62 V |

This mixture is very highly suitable for displays in TN mode and in particular for displays for use in computer monitors (5 V drivers) having a high clearing point (broad working-temperature range).

Example 2

A liquid-crystal mixture having the composition and properties as indicated in the following table is prepared.

| Composition Compound | | |
|---|---|---|
| No. | Abbreviation | |
| 1 | CPGU-3-OT | 5.0 |
| 2 | PGUQU-3-F | 6.0 |
| 3 | APUQU-2-F | 6.0 |
| 4 | APUQU-3-F | 6.0 |
| 5 | CCQU-3-F | 11.0 |
| 6 | CC-3-V | 44.0 |
| 7 | CCP-V-1 | 15.0 |
| 8 | PGP-2-3 | 2.0 |
| 9 | PGP-2-4 | 2.0 |
| 10 | CPGP-4-3 | 3.0 |
| Σ | | 100.0 |

Physical properties

| | |
|---|---|
| T(N, I) = | 97.5° C. |
| Δn (20° C., 589.3 nm) = | 0.1038 |
| $\epsilon_\parallel$ (20° C., 1 kHz) = | 10.0 |
| Δε (20° C., 1 kHz) = | 6.9 |
| $\gamma_1$ (20° C.) = | 74 mPa·s |
| $V_{10}$ (20° C.) = | 1.74 V |
| $V_{90}$ (20° C.) = | 2.65 V |

This mixture is very highly suitable for displays in TN mode and in particular for displays for use in computer monitors (5 V drivers) having a high clearing point (broad working-temperature range).

Example 3

A liquid-crystal mixture having the composition and properties as indicated in the following table is prepared.

| No. | Composition Compound Abbreviation | |
|---|---|---|
| 1 | CPGU-3-OT | 6.0 |
| 2 | PGUQU-3-F | 7.0 |
| 3 | APUQU-3-F | 10.0 |
| 4 | PUQU-3-F | 5.5 |
| 5 | PGU-3-F | 9.0 |
| 6 | CC-3-V | 46.0 |
| 7 | CCP-V-1 | 2.5 |
| 8 | PGP-2-3 | 4.0 |
| 9 | PGP-2-4 | 5.0 |
| 10 | PGP-2-5 | 5.0 |
| Σ | | 100.0 |

| Physical properties | |
|---|---|
| T(N, I) = | 75° C. |
| Δn (20° C., 589.3 nm) = | 0.1268 |
| $\epsilon_{\parallel}$ (20° C., 1 kHz) = | 12.8 |
| Δε (20° C., 1 kHz) = | 9.3 |
| $\gamma_1$ (20° C.) = | 65 mPa·s |
| $V_{10}$ (20° C.) = | 1.41 V |
| $V_{90}$ (20° C.) = | 2.10 V |

This mixture is very highly suitable for displays in TN mode and in particular for displays for use in notebooks (4 V drivers).

Example 4

A liquid-crystal mixture having the composition and properties as indicated in the following table is prepared.

| No. | Composition Compound Abbreviation | |
|---|---|---|
| 1 | CPGU-3-OT | 5.0 |
| 2 | PGUQU-3-F | 6.5 |
| 3 | APUQU-3-F | 4.0 |
| 4 | PGU-3-F | 8.5 |
| 5 | CC-3-V | 53.0 |
| 6 | PGP-2-3 | 6.0 |
| 7 | PGP-2-4 | 7.0 |
| 8 | PGP-2-5 | 10.0 |
| Σ | | 100.0 |

| Physical properties | |
|---|---|
| T(N, I) = | 75° C. |
| Δn (20° C., 589.3 nm) = | 0.1278 |
| $\epsilon_{\parallel}$ (20° C., 1 kHz) = | 8.3 |
| Δε (20° C., 1 kHz) = | 5.2 |
| $\gamma_1$ (20° C.) = | 55 mPa·s |
| $V_{10}$ (20° C.) = | 1.81 V |
| $V_{90}$ (20° C.) = | 2.65 V |

This mixture is very highly suitable for displays in TN mode and in particular for displays for use in computer monitors (6 V drivers).

Example 5

A liquid-crystal mixture having the composition and properties as indicated in the following table is prepared.

| No. | Composition Compound Abbreviation | |
|---|---|---|
| 1 | CPGU-3-OT | 5.0 |
| 2 | PGUQU-3-F | 7.0 |
| 3 | APUQU-2-F | 9.0 |
| 4 | APUQU-3-F | 9.0 |
| 5 | CCQU-3-F | 9.0 |
| 6 | PUQU-3-F | 14.0 |
| 7 | CC-3-V | 38.0 |
| 8 | CCP-V-1 | 9.0 |
| Σ | | 100.0 |

| Physical properties | |
|---|---|
| T(N, I) = | 76° C. |
| Δn (20° C., 589.3 nm) = | 0.1052 |
| $\epsilon_{\parallel}$ (20° C., 1 kHz) = | 18.1 |
| Δε (20° C., 1 kHz) = | 14.2 |
| $\gamma_1$ (20° C.) = | 80 mPa·s |
| $V_{10}$ (20° C.) = | 1.13 V |
| $V_{90}$ (20° C.) = | 1.73 V |

This mixture is very highly suitable for displays in TN mode and in particular for displays for use in notebooks (in particular with 3.3 V drivers).

Example 6

A liquid-crystal mixture having the composition and properties as indicated in the following table is prepared.

| No. | Composition Compound Abbreviation | |
|---|---|---|
| 1 | CPGU-3-OT | 5.0 |
| 2 | CGUQU-3-F | 9.0 |
| 3 | PGUQU-3-F | 7.0 |
| 4 | APUQU-2-F | 7.0 |
| 5 | APUQU-3-F | 7.0 |
| 6 | ACQU-2-F | 8.0 |
| 7 | PUQU-3-F | 11.0 |
| 8 | PGU-3-F | 4.0 |
| 9 | CC-3-V | 32.0 |
| 10 | CCP-V-1 | 9.0 |
| Σ | | 100.0 |

| Physical properties | |
|---|---|
| T(N, I) = | 75° C. |
| Δn (20° C., 589.3 nm) = | 0.1130 |
| $\epsilon_{\parallel}$ (20° C., 1 kHz) = | 21.6 |
| Δε (20° C., 1 kHz) = | 17.2 |
| $\gamma_1$ (20° C.) = | 98 mPa·s |
| $V_{10}$ (20° C.) = | 1.01 V |
| $V_{90}$ (20° C.) = | 1.55 V |

This mixture is very highly suitable for displays in TN mode and in particular for displays for use in notebooks (in particular with 2.5 V drivers).

Example 7

A liquid-crystal mixture having the composition and properties as indicated in the following table is prepared.

| Composition Compound | | |
|---|---|---|
| No. | Abbreviation | |
| 1 | CPGU-3-OT | 4.0 |
| 2 | CGUQU-3-F | 9.0 |
| 3 | PGUQU-3-F | 9.0 |
| 4 | APUQU-2-F | 8.0 |
| 5 | APUQU-3-F | 8.0 |
| 6 | ACQU-2-F | 10.0 |
| 7 | PUQU-3-F | 13.0 |
| 8 | CC-3-V | 30.0 |
| 9 | CCP-V-1 | 9.0 |
| Σ | | 100.0 |

| Physical properties | |
|---|---|
| T(N, I) = | 75.5° C. |
| Δn (20° C., 589.3 nm) = | 0.1125 |
| ε∥ (20° C., 1 kHz) = | 23.6 |
| Δε (20° C., 1 kHz) = | 19.1 |
| $\gamma_1$ (20° C.) = | 107 mPa·s |
| $V_{10}$ (20° C.) = | 0.97 V |
| $V_{90}$ (20° C.) = | 1.50 V |

This mixture is very highly suitable for displays in TN mode and in particular for displays for use in notebooks (in particular with 2.5 V drivers).

Example 8

A liquid-crystal mixture having the composition and properties as indicated in the following table is prepared.

| Composition Compound | | |
|---|---|---|
| No. | Abbreviation | |
| 1 | CPGU-3-OT | 3.0 |
| 2 | PGUQU-3-F | 7.0 |
| 3 | CDUQU-3-F | 9.0 |
| 4 | APUQU-2-F | 7.0 |
| 5 | APUQU-3-F | 8.0 |
| 6 | ACQU-2-F | 2.0 |
| 7 | PUQU-3-F | 14.0 |
| 8 | PGU-3-F | 7.0 |
| 9 | CC-3-V | 33.0 |
| 10 | CCP-V-1 | 10.0 |
| Σ | | 100.0 |

| Physical properties | |
|---|---|
| T(N, I) = | 74.0° C. |
| T(S, N) < | −40° C. |
| Δn (20° C., 589.3 nm) = | 0.1144 |
| ε∥ (20° C., 1 kHz) = | 22.0 |
| Δε (20° C., 1 kHz) = | 17.6 |
| $\gamma_1$ (20° C.) = | 93 mPa·s |
| $V_{10}$ (20° C.) = | 1.02 V |
| $V_{90}$ (20° C.) = | 1.56 V |

This mixture is very highly suitable for displays in TN mode and in particular for displays for use in notebooks (in particular with 2.5 V drivers).

Example 9

A liquid-crystal mixture having the composition and properties as indicated in the following table is prepared.

| Composition Compound | | |
|---|---|---|
| No. | Abbreviation | |
| 1 | CPGU-3-OT | 3.0 |
| 2 | PGUQU-3-F | 8.0 |
| 3 | CDUQU-3-F | 9.0 |
| 4 | APUQU-2-F | 6.0 |
| 5 | APUQU-3-F | 8.0 |
| 6 | ACQU-2-F | 2.0 |
| 7 | PUQU-3-F | 15.0 |
| 8 | PGU-3-F | 6.0 |
| 9 | CC-3-V | 33.0 |
| 10 | CCP-V-1 | 10.0 |
| Σ | | 100.0 |

| Physical properties | |
|---|---|
| T(N, I) = | 73.5° C. |
| T(S, N) < | −40° C. |
| Δn (20° C., 589.3 nm) = | 0.1140 |
| ε∥ (20° C., 1 kHz) = | 22.0 |
| Δε (20° C., 1 kHz) = | 17.6 |
| $\gamma_1$ (20° C.) = | 92 mPa·s |
| $V_{10}$ (20° C.) = | 1.00 V |
| $V_{90}$ (20° C.) = | 1.54 V |

This mixture is very highly suitable for displays in TN mode and in particular for displays for use in notebooks (in particular with 2.5 V drivers).

Example 10

A liquid-crystal mixture having the composition and properties as indicated in the following table is prepared.

| Composition Compound | | |
|---|---|---|
| No. | Abbreviation | |
| 1 | CPGU-3-OT | 4.0 |
| 2 | PGUQU-3-F | 8.0 |
| 3 | CDUQU-3-F | 8.0 |
| 4 | APUQU-2-F | 7.0 |
| 5 | APUQU-3-F | 8.0 |
| 6 | ACQU-2-F | 9.0 |
| 7 | PUQU-3-F | 10.0 |
| 8 | PGU-3-F | 7.0 |
| 9 | CC-3-V | 33.0 |
| 10 | CCP-V-1 | 7.0 |
| Σ | | 100.0 |

-continued

| | Physical properties | |
|---|---|---|
| T(N, I) = | | 74.0° C. |
| T(S, N) < | | −40° C. |
| Δn (20° C., 589.3 nm) = | | 0.1117 |
| ε∥ (20° C., 1 kHz) = | | 22.5 |
| Δε (20° C., 1 kHz) = | | 18.0 |
| γ₁ (20° C.) = | | 98 mPa · s |
| V₁₀ (20° C.) = | | 1.00 V |
| V₉₀ (20° C.) = | | 1.54 V |

This mixture is very highly suitable for displays in TN mode and in particular for displays for use in notebooks (in particular with 2.5 V drivers).

Example 11

A liquid-crystal mixture having the composition and properties as indicated in the following table is prepared.

| | Composition Compound | |
|---|---|---|
| No. | Abbreviation | |
| 1 | CPGU-3-OT | 3.0 |
| 2 | PGUQU-3-F | 8.0 |
| 3 | CDUQU-3-F | 8.0 |
| 4 | APUQU-2-F | 6.0 |
| 5 | APUQU-3-F | 8.0 |
| 6 | ACQU-2-F | 9.0 |
| 7 | PUQU-3-F | 11.0 |
| 8 | PGU-3-F | 7.0 |
| 9 | CC-3-V | 31.0 |
| 10 | CCP-V-1 | 9.0 |
| Σ | | 100.0 |

| | Physical properties | |
|---|---|---|
| T(N, I) = | | 75.5° C. |
| T(S, N) < | | −40° C. |
| Δn (20° C., 589.3 nm) = | | 0.1128 |
| ε∥ (20° C., 1 kHz) = | | 22.8 |
| Δε (20° C., 1 kHz) = | | 18.3 |
| γ₁ (20° C.) = | | 101 mPa · s |
| V₁₀ (20° C.) = | | 0.99 V |
| V₉₀ (20° C.) = | | 1.55 V |

This mixture is very highly suitable for displays in TN mode and in particular for displays for use in notebooks (in particular with 2.5 V drivers).

Example 12

A liquid-crystal mixture having the composition and properties as indicated in the following table is prepared.

| | Composition Compound | |
|---|---|---|
| No. | Abbreviation | |
| 1 | CPGU-3-OT | 3.0 |
| 2 | PGUQU-3-F | 8.0 |
| 3 | CDUQU-3-F | 8.0 |
| 4 | APUQU-2-F | 6.0 |
| 5 | APUQU-3-F | 8.0 |
| 6 | ACQU-2-F | 4.0 |
| 7 | ACQU-3-F | 10.0 |
| 8 | PUQU-3-F | 9.0 |
| 9 | PGU-3-F | 87.0 |
| 10 | CC-3-V | 28.5 |
| 11 | CCP-V-1 | 7.5 |
| Σ | | 100.0 |

| | Physical properties | |
|---|---|---|
| T(N, I) = | | 74.5° C. |
| T(S, N) < | | −40° C. |
| Δn (20° C., 589.3 nm) = | | 0.1122 |
| ε∥ (20° C., 1 kHz) = | | 24.4 |
| Δε (20° C., 1 kHz) = | | 19.7 |
| γ₁ (20° C.) = | | 109 mPa · s |
| V₁₀ (20° C.) = | | 0.95 V |
| V₉₀ (20° C.) = | | 1.47 V |

This mixture is very highly suitable for displays in TN mode and in particular for displays for use in notebooks (in particular with 2.5 V drivers).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding German application No. 102008007242.7, filed Feb. 1, 2008 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystal medium, comprising the following components:
   a first dielectrically positive component, component A, comprising one or more dielectrically positive compounds of formula IA, one or more dielectrically positive compounds of formula IB and one or more dielectrically positive compounds of formula IC

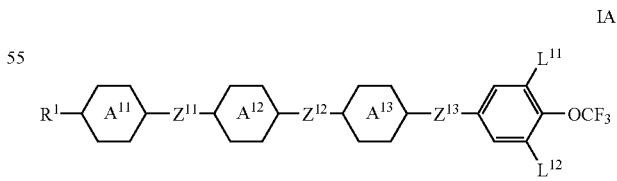

IA

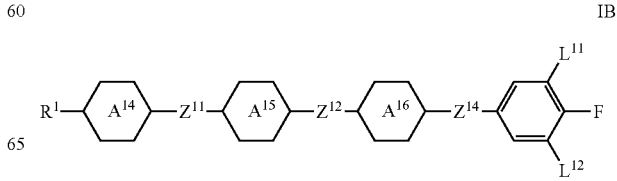

IB

-continued

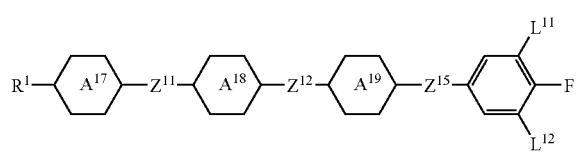
IC in which
R¹ denotes alkyl, alkoxy, fluorinated alkyl or fluorinated alkoxy having 1 to 7 C atoms, alkenyl, alkenyloxy, alkoxy-alkyl or fluorinated alkenyl having 2 to 7 C atoms,

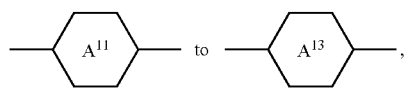

independently of one another, denote

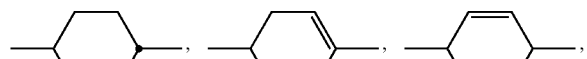
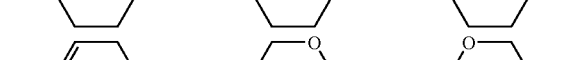
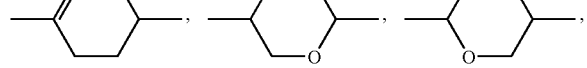

independently of one another,

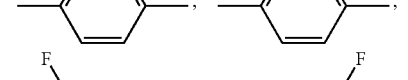
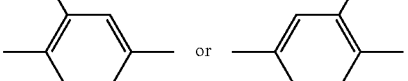

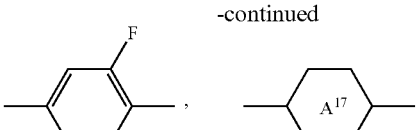
denotes

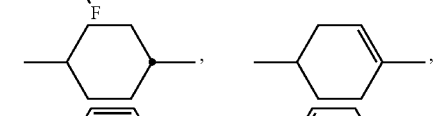
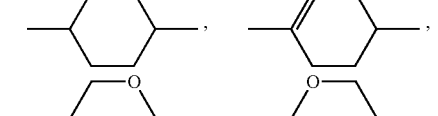
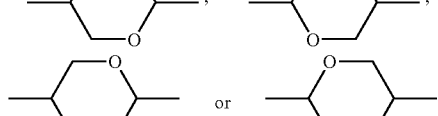
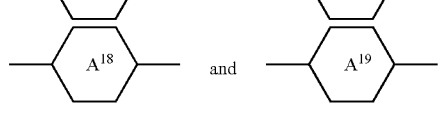

independently of one another, denote

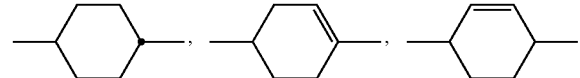
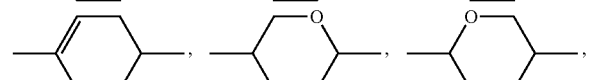
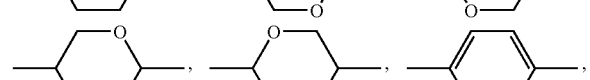
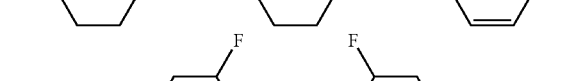
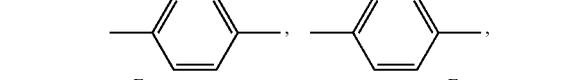
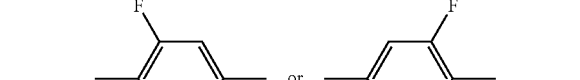

$Z^{11}$ to $Z^{13}$ independently of one another, denote —CH₂CH₂—, —CF₂CF₂—, —COO—, trans-CH=CH—, trans-CF=CF—, —CH₂O—, —CF₂O— or a single bond, $Z^{14}$ and $Z^{15}$ are —CF₂O—, $L^{11}$ and $L^{12}$, independently of one another, denote H, F or Cl, and optionally a second dielectrically positive component, component B, comprising one or more dielectrically positive compounds, optionally a dielectrically neutral component, component C, comprising one or more dielectrically neutral compounds of formula IV

IV

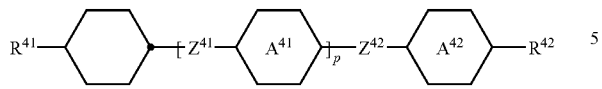

in which
R⁴¹ and R⁴² independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

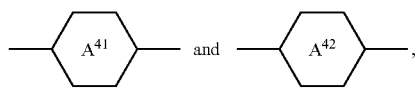

independently of one another and, in the case where

occurs twice, also these independently of one another, denote

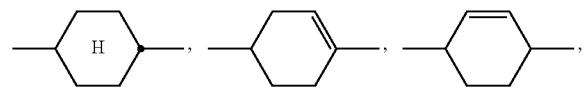

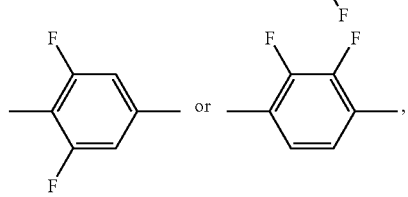

Z⁴¹ and Z⁴², independently of one another and, in the case where Z⁴¹ occurs twice, also these independently of one another, denote —CH₂CH₂—, —COO—, trans-CH=CH—, trans-CF=CF—, —CH₂O—, —CF₂O—, —C≡C— or a single bond, and
p denotes 0, 1 or 2.

2. A liquid-crystal medium according to claim 1, wherein the concentration of component A in the medium is 5% to 40%.

3. A liquid-crystal medium, comprising the following components:
a first dielectrically positive component, component A, comprising, one or more dielectrically positive compounds of formula IA, one or more dielectrically positive compounds of formula IB and one or more dielectrically positive compounds of formula IC

IA

IB

IC

in which
R¹ denotes alkyl, alkoxy, fluorinated alkyl or fluorinated alkoxy having 1 to 7 C atoms, alkenyl, alkenyloxy, alkoxy-alkyl or fluorinated alkenyl having 2 to 7 C atoms,

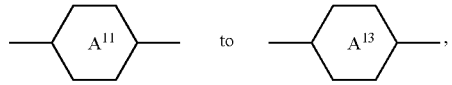

independently of one another, denote

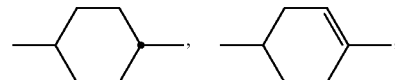

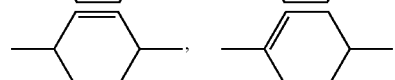

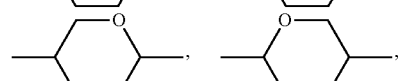

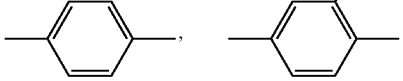

-continued

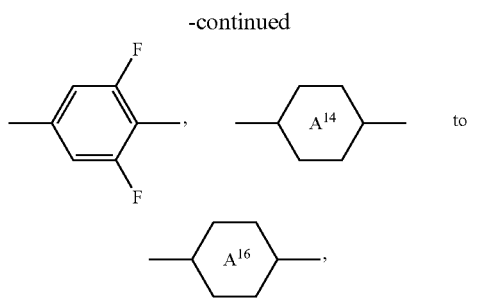

independently of one another,

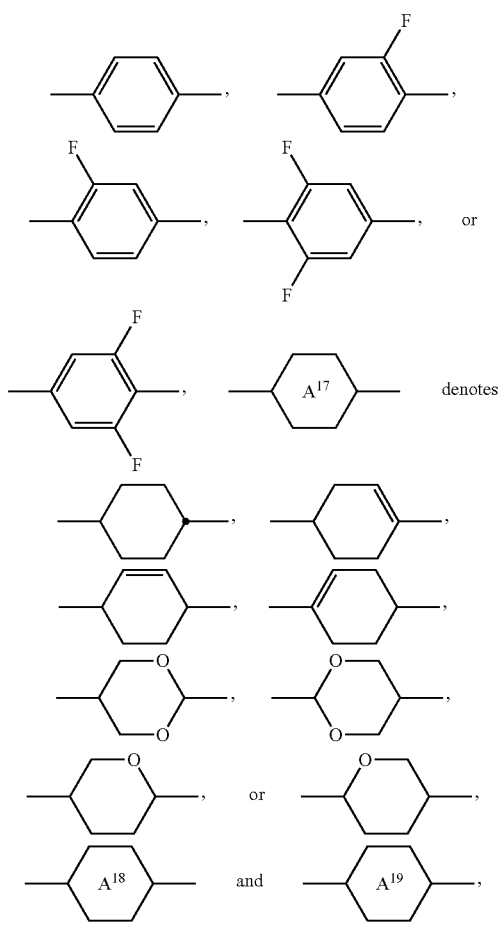

independently of one another, denote

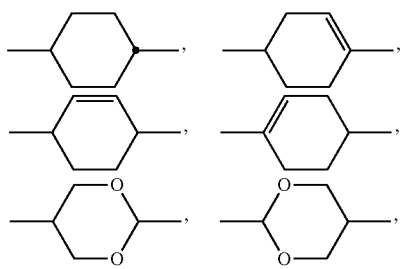

-continued

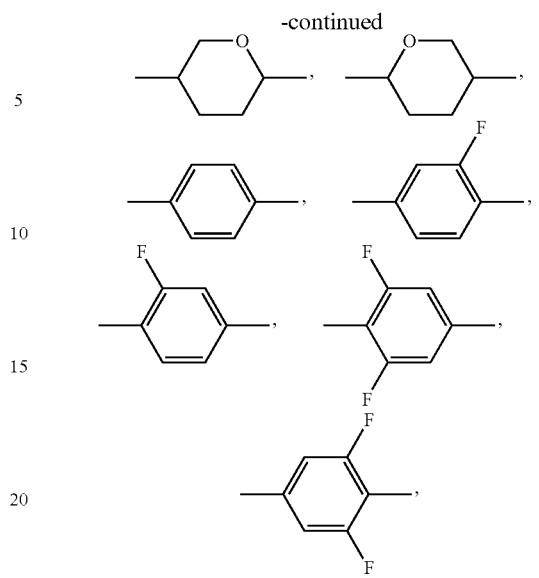

$Z^{11}$ to $Z^{12}$ independently of one another denote —CH$_2$CH$_2$—, —CF$_2$CF$_2$—, —COO—, trans-CH=CH—, trans-CF=CF—, —CH$_2$O—, CF$_2$O— or a single bond, $Z^{13}$ denotes a single bond, $Z^{14}$ and $Z^{15}$ are —CF$_2$O—, $L^{11}$ and $L^{12}$, independently of one another, denote H, F or Cl, and optionally a second dielectrically positive component, component B, comprising one or more dielectrically positive compounds, optionally a dielectrically neutral component, component C, comprising one or more dielectrically neutral compounds of formula IV

IV

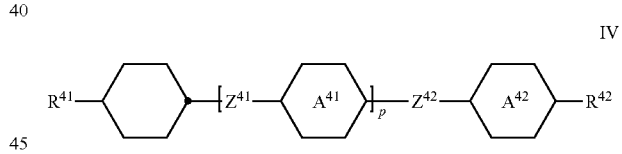

in which $R^{41}$ and $R^{42}$ independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

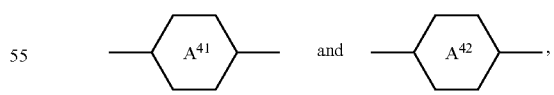

independently of one another and, in the case where occurs twice, also these independently of one another, denote

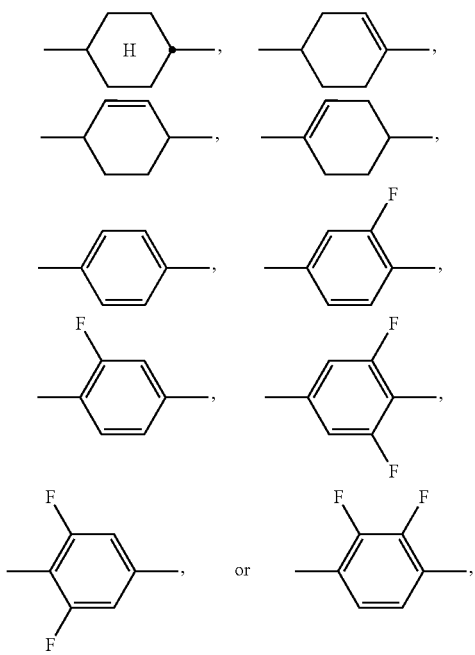

$Z^{41}$ and $Z^{42}$, independently of one another and, in the case where $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. A liquid-crystal medium according to claim 1, which comprises one or more dielectrically neutral compounds of formula IV.

5. A liquid-crystal medium according to claim 1, which further comprises a dielectrically neutral component, component D, comprising one or more dielectrically neutral compounds of formula VI

VI

in which $R^{61}$ and $R^{62}$ independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

and if it occurs twice, independently of one another on each occurrence, denotes

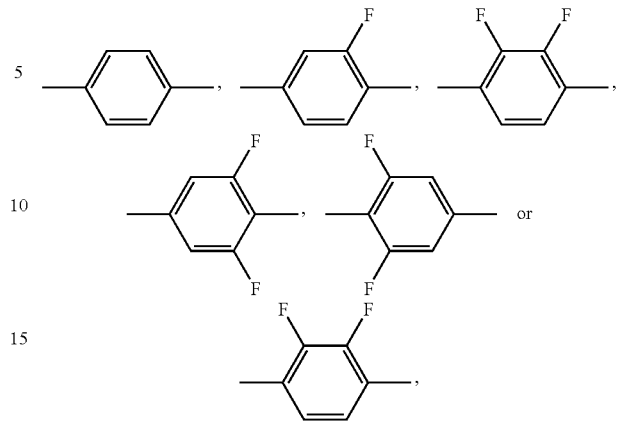

$Z^{61}$ and $Z^{62}$, independently of one another and, if $Z^{61}$ occurs twice, also these independently of one another, denote —CH$_2$CH$_2$—, —COO—, trans-CH=CH—, trans-CF=CF—, —CH$_2$O—, —CF$_2$O— or a single bond, and r denotes 0, 1 or 2.

6. A liquid-crystal display, which contains a liquid-crystal medium according to claim 1.

7. A liquid-crystal display according to claim 6, which is addressed by an active matrix.

8. A liquid-crystal medium according to claim 1, wherein component B comprises one or more dielectrically positive compounds of formulae II or III

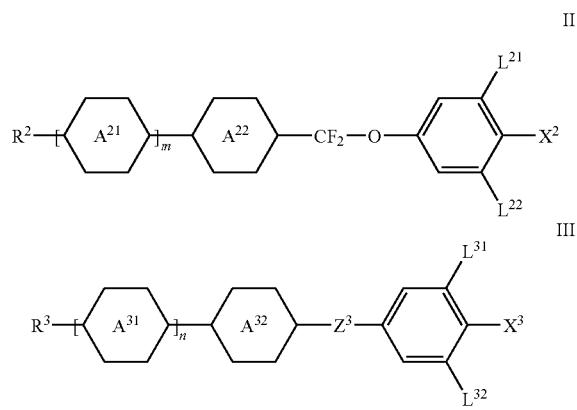

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

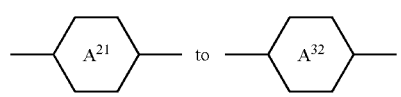

on each occurrence, independently of one another, denote

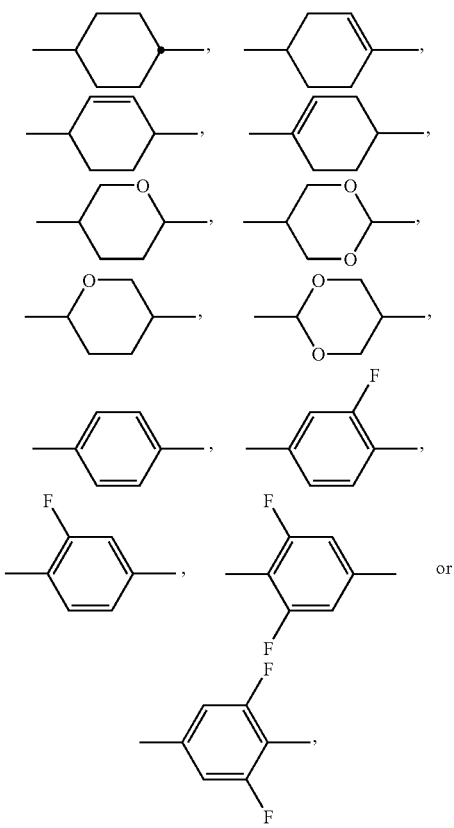

$L^{21}$, $L^{22}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —$CH_2CH_2$—, —$CF_2CF_2$—, —COO—, trans-CH=CH—, trans-CF=CF—, —$CH_2O$— or a single bond, and m and n, independently of one another, denote 0, 1 or 3, and in the case where $X^2$ does not denote F or $OCF_3$, m may also denote 2, and in the case where $X^3$ does not denote F or $OCF_3$ and/or $Z^3$ does not denote a single bond, n may also denote 2.

9. A liquid-crystalline medium according to claim 1, wherein component B comprises one or more dielectrically positive compounds having a dielectric anisotropy of greater than 3.

10. A liquid-crystalline medium according to claim 1, wherein component A comprises one or more dielectrically positive compounds having a dielectric anisotropy of greater than 3.

11. A liquid-crystalline medium according to claim 1, wherein component A predominantly consists of compounds of formulae IA, IB and IC.

12. A liquid-crystalline medium according to claim 1, wherein component A essentially consists of compounds of formulae IA, IB and IC.

13. A liquid-crystalline medium according to claim 1, wherein component A entirely consists of compounds of formulae IA, IB and IC.

14. A liquid-crystalline medium according to claim 1, wherein component A entirely consists of compounds having a dielectric anisotropy of greater than 3.

15. A liquid-crystal medium according to claim 8, which comprises one or more compounds of formula II.

16. A liquid-crystal medium according to claim 8, which comprises one or more compounds of formula III.

17. A liquid-crystal medium according to claim 3, which comprises one or more dielectrically neutral compounds of formula IV.

18. A liquid-crystal medium according to claim 3, wherein component B comprises one or more dielectrically positive compounds of formulae II or III

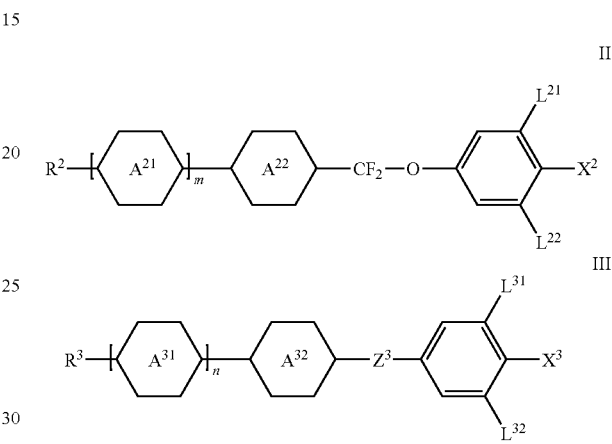

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

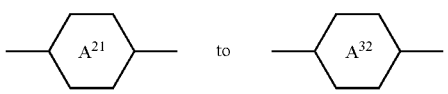

on each occurrence, independently of one another, denote

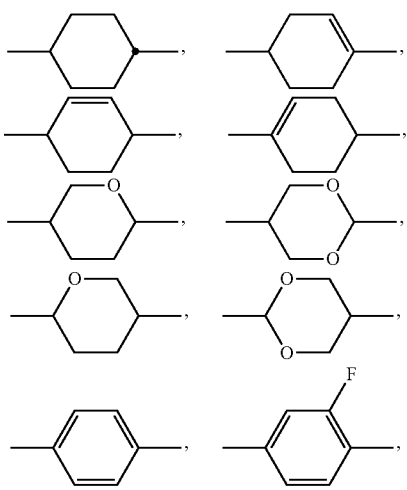

-continued

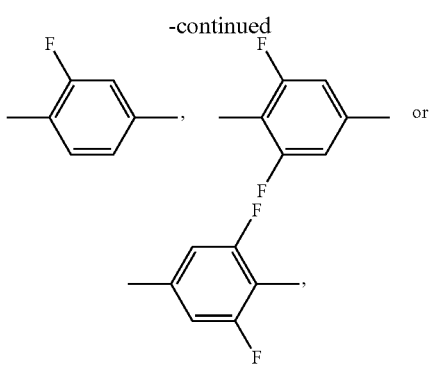

or $L^{21}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and m and n, independently of one another, denote 0, 1 or 3, and in the case where $X^2$ does not denote F or OCF$_3$, m may also denote 2, and in the case where $X^3$ does not denote F or OCF$_3$ and/or $Z^3$ does not denote a single bond, n may also denote 2.

* * * * *